(12) United States Patent
Xin et al.

(10) Patent No.: US 10,798,317 B2
(45) Date of Patent: Oct. 6, 2020

(54) MULTISPECTRAL COLOR IMAGING DEVICE BASED ON INTEGRATING SPHERE LIGHTING AND CALIBRATION METHODS THEREOF

(71) Applicant: The Hong Kong Research Institute of Textiles and Apparel Limited, Hong Kong (HK)

(72) Inventors: John Haozhong Xin, Hong Kong (HK); Hui-liang Shen, Hangzhou (CN); Quan-geng Ge, Hangzhou (CN)

(73) Assignee: The Hong Kong Research Institute of Textiles and Apparel Limited, Hong Kong (CN)

( * ) Notice: Subject to any disclaimer, the term of this patent is extended or adjusted under 35 U.S.C. 154(b) by 48 days.

(21) Appl. No.: 15/995,198

(22) Filed: Jun. 1, 2018

(65) Prior Publication Data
US 2019/0182440 A1   Jun. 13, 2019

(30) Foreign Application Priority Data
Dec. 13, 2017   (CN) .......................... 2017 1 1327334

(51) Int. Cl.
*H04N 5/33*     (2006.01)
*G06T 7/90*     (2017.01)
(Continued)

(52) U.S. Cl.
CPC .............. *H04N 5/332* (2013.01); *G01J 3/021* (2013.01); *G01J 3/0208* (2013.01);
(Continued)

(58) Field of Classification Search
CPC .. H04N 5/332; H04N 9/04; G06T 7/90; G01J 3/0208; G01J 3/021; G01J 3/0216;
(Continued)

(56) References Cited

U.S. PATENT DOCUMENTS 5,319,472 A   6/1994   Hill et al.
5,850,472 A   12/1998   Alston et al.
(Continued)

FOREIGN PATENT DOCUMENTS

CN    101793671 A    8/2010
CN    102466520 A    5/2012
(Continued)

OTHER PUBLICATIONS

International Search Report and Written Opinion of PCT application No. PCT/CN2018/089619 issued from the International Search Authority dated Sep. 7, 2018.

*Primary Examiner* — Patricia I Young
(74) *Attorney, Agent, or Firm* — Spruson & Ferguson (Hong Kong) Limited

(57) ABSTRACT

The present invention provides a multispectral color imaging device, an automatic calibration method based on a reference reflective surface, and a method for eliminating background signals. A multispectral color imaging device including a light house module comprising a light source and a light intensity collection device surrounding the light source; an integrating sphere module including an integrating sphere, a light inlet on one side of the integrating sphere, a light outlet on the top of the integrating sphere, a sample holder gateway on the other side of the integrating sphere and a sample holder having access to the interior of the integrating sphere; and a filter wheel module including a camera, a filter wheel below the camera, and a lens below the filter wheel. The device and calibration methods of the present invention together improve the accuracy and stability of the measurement.

13 Claims, 16 Drawing Sheets

(51) Int. Cl.
*G01J 3/00* (2006.01)
*G01J 3/10* (2006.01)
*G01J 3/28* (2006.01)
*G01J 3/51* (2006.01)
*H04N 9/04* (2006.01)
*G01J 3/02* (2006.01)
*G01J 3/12* (2006.01)

(52) U.S. Cl.
CPC ........... *G01J 3/0216* (2013.01); *G01J 3/0251* (2013.01); *G01J 3/10* (2013.01); *G01J 3/2823* (2013.01); *G01J 3/51* (2013.01); *G06T 7/90* (2017.01); *H04N 9/04* (2013.01); *G01J 2003/1217* (2013.01); *G01J 2003/2826* (2013.01); *G06T 2207/10024* (2013.01)

(58) Field of Classification Search
CPC .......... G01J 3/0251; G01J 3/10; G01J 3/2823; G01J 3/51

USPC ........................................................ 348/145
See application file for complete search history.

(56) References Cited

U.S. PATENT DOCUMENTS

| | | |
|---|---|---|
| 6,269,182 B1 | 7/2001 | Ishii |
| 7,113,281 B2 | 9/2006 | Ott |
| 9,247,127 B2 | 1/2016 | Shen et al. |
| 9,417,132 B2 | 8/2016 | Xin et al. |
| 2016/0231170 A1* | 8/2016 | Wei ..................... G01J 3/0251 |

FOREIGN PATENT DOCUMENTS

| | | |
|---|---|---|
| CN | 103941521 A | 7/2014 |
| CN | 104200066 A | 12/2014 |

* cited by examiner

MULTISPECTRAL COLOR IMAGING DEVICE BASED ON INTEGRATING SPHERE LIGHTING AND CALIBRATION METHODS THEREOF

CROSS REFERENCE TO RELATED APPLICATION

The present application claims priority to CN201711327334.X filed on Dec. 13, 2017, the disclosure of which is hereby incorporated by reference in its entirety.

FIELD OF THE INVENTION

The present disclosure relates to the field of imaging and color measurement, particularly relates to a multispectral color imaging device based on integrating sphere lighting and calibration methods thereof.

BACKGROUND OF THE INVENTION

In color measurement of an object, spectral reflectance of the object's surface should be accurately measured. Conventionally, color measurement is performed by using spectrophotometers. However, while the spectrophotometers can accurately measure the spectral reflectance curve of the object's surface, there are still theoretical limitations. In addition, when using the spectrophotometers, the color of the object's surface is required to be uniformly and substantially similar. For samples with multiple colors and complex textured surfaces, the use of spectrophotometers hardly achieves satisfactory results. On the other hand, spectrophotometers cannot record image information of tested samples during color measurement and are hence not intuitive. Consequently, spectrophotometers cannot be used to measure textile and clothing samples, such as yarn-dyed, printed, and lace samples. The emergence of multispectral imaging technology solves the above-mentioned problems in spectrophotometers for color measurement. However, existing multispectral color imaging devices have shortcomings. For instance, the light distribution is not homogeneous, the stability is poor, and the precision of measurement is low. Integrating spheres, also known as photometric spheres, light-through spheres, etc., are cavity spheres coated with diffuse reflective material on their inner walls. In general, the wall of a single sphere has a light inlet and a light outlet. The light inlet allows light to enter the integrating sphere and the light outlet is for positioning a light receiving device. The inner wall of an integrating sphere should be a good sphere. The basic working principle of existing integrating spheres for measuring light intensity is in general as follows. After the light enters the integrating sphere through the light inlet, the light is uniformly reflected and diffused by the inner wall coating of the integrating sphere. A homogeneous light intensity distribution is then formed on the sphere inner surface, and an extremely uniform diffusive beam is ultimately emitted through the light outlet. Generally, in precision measurements, an integrating sphere can be used as an optical diffuser to minimize the aforementioned errors. When measuring luminous flux using an integrating sphere, the obtained results are more reliable. It is because the integrating sphere can reduce and eliminate the measurement errors caused by different shapes of light beams, different divergence angles, and differences in response degrees at different positions of a detector. However, integrating spheres have never been applied in the industry of textile clothing and similar-color measurement.

Besides, the calibration process of traditional multispectral imaging device comprises exposure time estimation, illumination balance, autofocusing, channel alignment, ghost elimination, color correction, etc. In addition, the traditional multispectral imaging device undergoes multiple reflections, which seriously jeopardize the accuracy of color measurement. This problem also exists in integrating sphere devices. Moreover, as the reflectivity of each point on the inner wall of an integrating sphere is made larger, the effect of undesired multiple reflections would be even stronger within the integrating sphere. It would further adversely affect the accuracy of measurement.

SUMMARY OF THE INVENTION

To solve the aforementioned problems, the present disclosure provides a multispectral color imaging device, an automatic calibration method based on a reference reflective surface, and a method for eliminating background signals. A multispectral color imaging device including a light house module comprising a light source and a light intensity collection device surrounding the light source; an integrating sphere module including an integrating sphere, a light inlet on one side of the integrating sphere, a light outlet on the top of the integrating sphere, a sample holder gateway on the other side of the integrating sphere and a sample holder having access to the internal space of the integrating sphere; and a filter wheel module including a camera, a filter wheel below the camera, and a lens below the filter wheel. The device and calibration methods of the present invention together improve the accuracy and stability of the measurement.

In a first aspect of the present disclosure, there is provided a multispectral color imaging device, comprising: a light house module, the light house module comprising a light source and a light intensity collection device surrounding the light source, wherein the light intensity collection device collects light radiated from the light source via reflection and emits the collected light through an opening of the light intensity collection device; an integrating sphere module, the integrating sphere module comprising an integrating sphere, a light inlet at a first side of the integrating sphere, a sample holder gateway at a second side of the integrating sphere, a light outlet at the top of the integrating sphere, and a sample holder having access to an internal space of the integrating sphere, wherein the first and second sides are opposite to each other, the light inlet couples to the opening of the light intensity collection device, and the sample holder accesses the internal space of the integrating sphere through the sample holder gateway and is positioned in alignment with the light outlet during imaging; and a filter wheel module, the filter wheel module comprising a camera, a filter wheel installed below the camera, and a lens installed below the filter wheel, the lens coupling to the light outlet of the integrating sphere, the filter wheel having a plurality of channels and a plurality of filters located therein, wherein one of the filters is configurable to position between the camera and the lens for filtering.

In a first embodiment of the first aspect of the present disclosure, the multispectral color imaging device further comprises: an ultraviolet light filtering module, the ultraviolet light filtering module being positioned between the light house module and the integrating sphere module for adjusting a ratio between ultraviolet light and visible light of the light emitted from the light house module to the integrating sphere module.

In a second embodiment of the first aspect of the present disclosure, the sample holder is slidable into the integrating sphere via a slideway element.

In a third embodiment of the first aspect of the present disclosure, the sample holder comprises a platform portion and a frame portion, the frame portion comprising a sample fixing groove and a linear slideway, wherein the linear slideway is configured to enter the integrating sphere through the sample holder gateway and to be fixed to the inner wall of the integrating sphere, and the sample fixing groove is configured to attach to the platform portion and to slide along the linear slideway so that the platform portion is also slidable along the linear slideway.

In a fourth embodiment of the first aspect of the present disclosure, the sample holder comprises a sphere lid portion, the sphere lid portion having a dimension that matches a dimension of the sample holder gateway so that when the sample holder is at an imaging position, the sphere lid portion covers the sample holder gateway to ensure the completeness of the integrating sphere for homogeneous lighting.

In a fifth embodiment of the first aspect of the present disclosure, the ultraviolet light filtering module comprises an ultraviolet filter frame and a guideway element, wherein the ultraviolet filter frame has installed therewithin an ultraviolet-light-passing film, an ultraviolet-light-blocking film, and an all-light-passing film, and the guideway element is configured to move together with the ultraviolet filter frame.

In a sixth embodiment of the first aspect of the present disclosure, the camera seamlessly connects to a camera port on upper cover of the filter wheel through a port on the camera, and the lens seamlessly connects to a bayonet interface on lower cover of the filter wheel through a bayonet of the lens.

In a seventh embodiment of the first aspect of the present disclosure, the camera port comprises an annular protrusion in the middle of the camera port, and a mounting portion surrounding the annular protrusion, wherein the annular protrusion has thread on the outer surface thereof, and wherein the port on the camera is configured to seamlessly connect with the camera port.

In an eighth embodiment of the first aspect of the present disclosure, the bayonet interface comprises a hollow bottom plate portion located at the bottom of the bayonet interface, an outer wall interface portion, an inner wall located at the inner side of the outer wall interface portion and along interface circumference and a guide chute on the inner wall, wherein said guide chute comprises a discontinuous chute wall, the bayonet of the lens includes an outer peripheral wall, an outer wall, and a guiding portion on the outer wall capable of cooperating with the guide chute, said guiding portion enters the guide chute from the gap of the discontinuous chute wall and moves along the guide chute until said outer peripheral wall contacts and seals said outer wall interface portion.

In a ninth embodiment of the first aspect of the present disclosure, center of a sensor of the camera, center of the lens, and center of a filter in use of the filter wheel are on a straight line.

In a tenth embodiment of the first aspect of the present disclosure, the filter wheel comprises a filter rotating element installed in a hollow part of the filter wheel, wherein the filter rotating element comprises an outer rim region for positioning the filters, and is rotated by a driving device for positioning a selected filter in alignment with the lens and the camera wherein the positioning is controlled by a photoelectric switch.

In an eleventh embodiment of the first aspect of the present disclosure, the filter wheel module further comprises a motor drive control module and a micro limit switch, wherein the motor drive control module is configured for controlling a motor enabling automatic focusing of the lens, and the micro limit switch is configured to prevent detachment of the lens.

In a second aspect of the present disclosure, there is provided an automatic calibration method based on a reference reflective surface, comprising the steps of: (a) measuring and recording brightness value of at least one calibration white block surrounding a sample holder; (b) measuring and recording brightness value of a selected pixel of a sample; and (c) calculating calibrated brightness value of the selected pixel using formula (1):

$$I_{pixel0} = I_{pixel} \cdot \frac{I_{patch0}}{I_{patch}} \quad (1)$$

where, $I_{pixel0}$ represents the calibrated brightness value of the selected pixel, $I_{pixel}$ represents the actually measured brightness value of the selected pixel, $I_{patch0}$ represents the standard brightness value of the calibration white block when the light is balanced, $I_{patch}$ represents the brightness value of the calibration white block during the actual measurement.

In a first embodiment of the second aspect of the present disclosure, the standard brightness value is obtained by placing a standard white board on the sample holder and measuring the brightness value of the calibration white board.

In a second embodiment of the second aspect of the present disclosure, the brightness value of the at least one calibration white board and the brightness value of the selected pixel are measured and recorded in real-time, so as to real-time calibrate the brightness value of the selected pixel.

In a third embodiment of the second aspect of the present disclosure, the method is carried out using the multispectral color imaging device according to the first aspect of the present disclosure.

In a third aspect of the present disclosure, there is provided a method for eliminating background signals, comprising the steps of: (a) collecting a plurality of spectral response values of a plurality of color blocks on a background plate with different colors on a sample holder; (b) obtaining modeling coefficients by analyzing the plurality of spectral response values and mathematical modeling for each response value channel; and (c) real-time adjusting spectral response values obtained from real-time imaging using a model for the mathematical modeling and the modeling coefficients.

In a first embodiment of the third aspect of the present disclosure, the method uses at least four color blocks and a background plate with at least five different colors, and wherein the modeling coefficients are obtained from mathematical modeling using the equation:

$$r_{std} = (a_1 \cdot \text{ratio} + a)(r_{bar} + a_3) + a_4 \quad (2)$$

where, $r_{std}$ represents a standard response value of a certain color block at a certain channel, the standard response value is a response value measured at the brightest background, ratio=$I_{patch0}/I_{patch}$, $I_{patch0}$ represents the standard brightness value of a white block when the lightening is balanced, $I_{patch}$ represents the brightness value of the white block measured in real time, $r_{bat}$ represents the normalized value of the response value of the color block measured at other backgrounds, and $a_1\sim a_4$ represent the coefficients of the model to be obtained; wherein, the $a_1\sim a_4$ were obtained by measuring at least four color blocks.

In a second embodiment of the third aspect of the present disclosure, the step (c) comprises adjusting spectral response values obtained from real-time imaging of samples using the equation:

$$r_{std} = (a_1 \cdot \text{ratio} + a)(r_{bat} + a_3) + a_4 \qquad (3)$$

where $r_{std}$ represents a response value of a sample after background elimination, ratio=$I_{patch0}/I_{patch}$, $I_{patch0}$ represents the standard brightness value of a white block when the lightening is balanced, $I_{patch}$ represents the brightness value of the white block measured in real time, $r_{bat}$ represents the normalized response value without background elimination, and $a_1\sim a_4$ represent the coefficients obtained during the step (b).

In a third embodiment of the third aspect of the present disclosure, the steps (a)-(c) are executed by the multispectral color imaging device according to the first aspect of the present disclosure.

The invention includes all such variation and modifications. The invention also includes all of the steps and features referred to or indicated in the specification, individually or collectively and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but excludes elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

DETAILED DESCRIPTION OF THE INVENTION

Preferred embodiments of the present invention will now be described in detail with reference to the accompanying drawings.

Multispectral imaging technology can solve the above-mentioned problems in color measurement that uses spectrophotometers. A complete multispectral imaging device comprises a light source, a fixed or zoom lens, a filter wheel with narrow-band filters and a monochrome or color camera. The data collection process can be briefly described as follows: filters of different wavelengths are placed between a sample and camera by rotating the filter wheel by a filter wheel motor to form channels of different wavelengths. Images of a sample are taken through each channel, so as to obtain response values of the tested sample at different channels.

Figure 1:
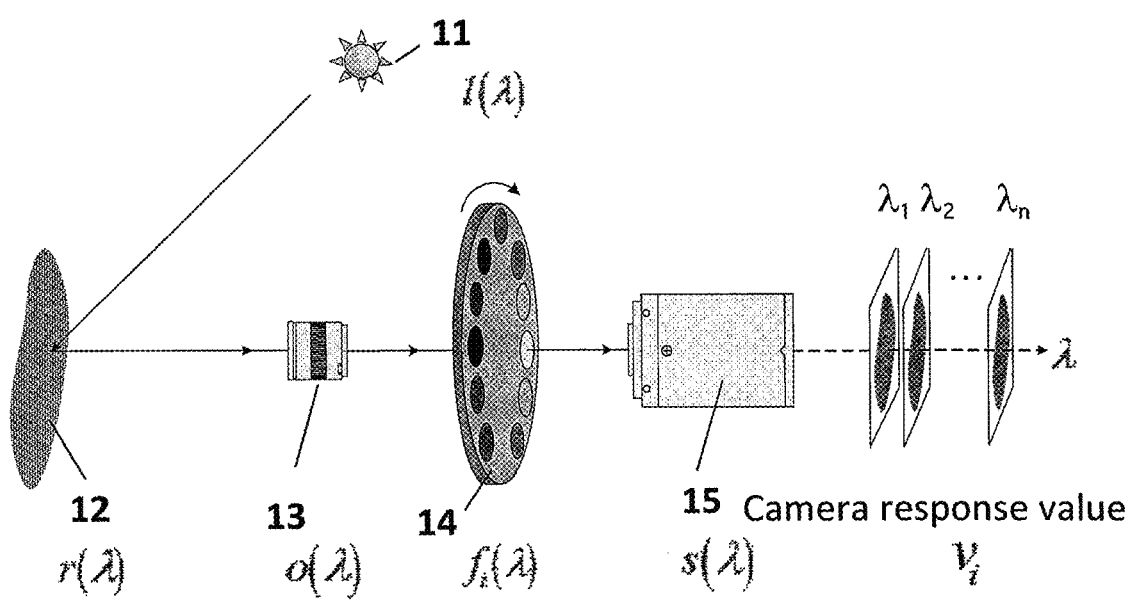
FIG. 1 is a schematic diagram of the technical principle of the multispectral color imaging device according to the present invention.

FIG. 1 is a schematic diagram showing the principle of multispectral technology according to the present invention. As shown in FIG. 1, a complete multispectral imaging device includes a light source 11, a tested sample 12, a lens 13, a filter wheel 14, and a camera 15, and may also include other components as needed. These components work in cooperation to ultimately achieve multispectral imaging with high accuracy.

Assume that the spectral distribution function of the light source is $l(\lambda)$, the measured reflectivity function of the sample is $r(\lambda)$, the spectral transfer function of the lens is $o(\lambda)$, the transmittance of the $i^{th}$ channel filter is $f_i(\lambda)$, and the light sensitivity function of the CCD camera is $s(\lambda)$. The response output of the $i^{th}$ channel of the system is:

$$v_i = \int l(\lambda) r(\lambda) o(\lambda) f_i(\lambda) s(\lambda) d\lambda + b_i + n_i = \int m_i(\lambda) r(\lambda) d\lambda + b_i + n_i \quad (1)$$

where $b_i$ represents the response of the dark current of the camera, and $n_i$ represents the image noise. Since it is difficult to determine each of $l(\lambda)$, $o(\lambda)$, $f_i(\lambda)$ and $s(\lambda)$, these four parameters are combined into one spectral response function:

$$m_i(\lambda) = l(\lambda) o(\lambda) f_i(\lambda) s(\lambda).$$

Consider that the spectral reflectivity changes continuously at the visible wavelength range of 400-700 nm, and is represented by a sample point collected every 10 nm in the practical application. The spectral reflectivity can be expressed as a N×1 vector (N=31). Similarly, the system response value can also be expressed as a C×1 vector. Accordingly, equation (1) can be reconstructed into the following vector matrix form:

$$v = Mr + b + n \quad (2)$$

where M represents the spectral response function matrix (of dimension C×N) obtained by equation (1), b represents the dark current response vector (of dimension C×1) of the camera, and n represents the image noise vector (of dimension C×1).

Let $u = v − b$ be a linear response. Then equation (2) can be written as:

$$u = Mr + n.$$

For a nonlinear imaging system, there is a nonlinear photoelectric conversion relationship between its linear response u and the actual response ρ, specifically represented as:

$$\rho = F(u) = F(Mr + n),$$

where F(u) is a one-dimensional nonlinear monotonic function, usually obtained by imaging multiple grayscale colors.

Figure 2:
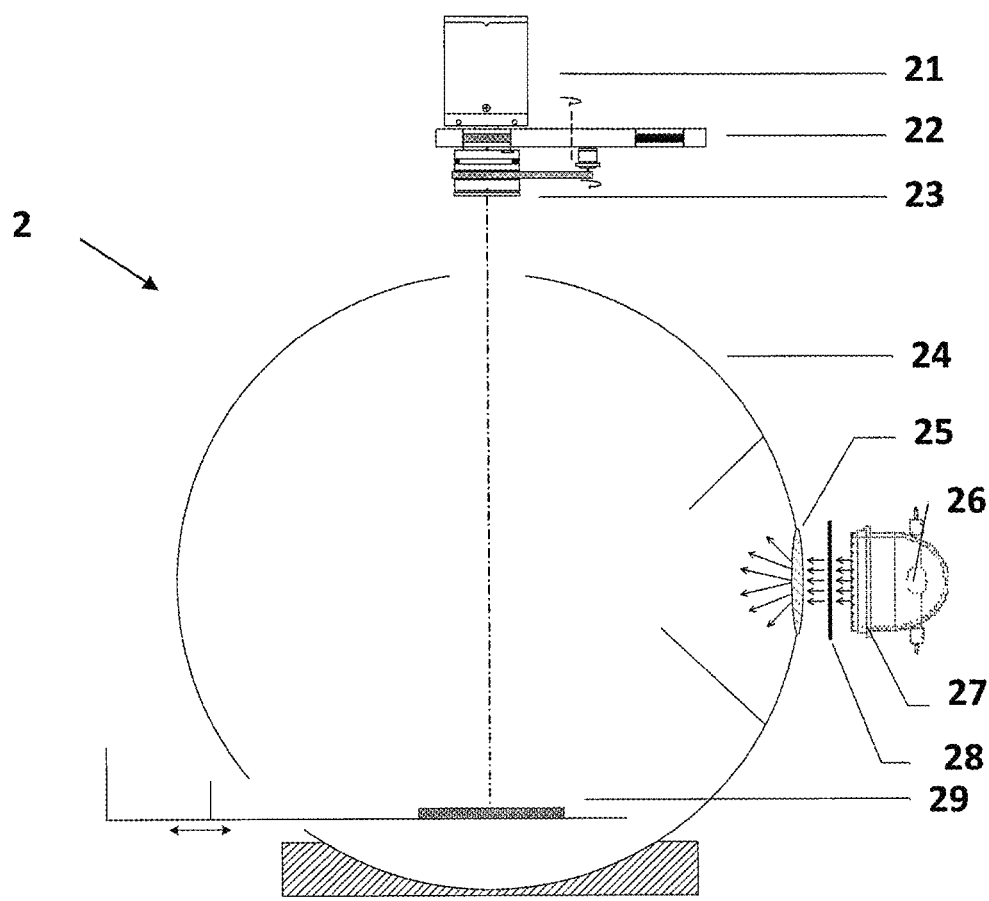
FIG. 2 is a schematic structural diagram of a multispectral color imaging device according to a preferred embodiment of the present invention.

FIG. 2 is a schematic structural diagram of a multispectral color imaging device 2 according to a preferred embodiment of the present invention. The multispectral color imaging device comprises at least a light house module, an integrating sphere module, and a filter wheel module. The light house module comprises a light source, a light intensity collection device and a light source electrode protection device, wherein the light source electrode protection device is used for protecting the light source so as to prevent the light source from being damaged due to over-voltage when the light source is powered on. As shown in FIG. 2, in order to ensure provision of homogeneous illumination on the tested sample, an integrating sphere 24 is introduced to the multispectral color imaging device. The light emitted from the light source 26 is reflected in and hence collected by the light intensity collection device 27. The collected light enters the integrating sphere 24 through the scattering structure 25, forming a homogeneous illumination system. The integrating sphere module includes a drawer-like sliding stage to facilitate feeding the sample into the integrating sphere, and the sliding stage fills up the opening of the integrating sphere to ensure the integrity of the integrating sphere, thereby ensuring the homogeneity of the reflected light of the integrating sphere. According to different choices of light sources, an ultraviolet light filtering module 28 can be added before the light enters the integrating sphere system, so that the ratio of ultraviolet light and the visible light can be changed by stably moving the ultraviolet light filter by using the motor and the slide rail. As such, different forms of light sources, e.g. light sources with a UV ratio of UV0%, UV1-99%, UV100%, etc. are formed. The filter wheel module includes a filter wheel 22, a camera 21 above the filter wheel 22, and a lens 23 below the filter wheel 22. The filter wheel module is installed at the light outlet of the integrating sphere on top of the integrating sphere. In order to ensure that the filter is not contaminated by the dust, a sealed structure enclosing the camera 21, the filter wheel 22 and the lens 23 from top to bottom is formed through a transformed conversion port. In addition, all the electronic control devices are installed below the lower cover of the filter wheel, which is enclosed by a shell, so that the filter wheel module becomes a completely independent device, which is easy to operate and has strong practicality. In the multispectral color imaging device, the optimal distance between the lens 23 within the sealed structure and the light outlet of the integrating sphere is 1-8 times, preferably 1.5-6 times, and more preferably 2-5 times of the diameter of the light out of the integrating sphere. The sample holder 29 is directly fed into the interior of the integrating sphere through a drawer structure made of slide rails or the like, so that the homogeneity of the integrating sphere light source can be effectively utilized and the position of the sample holder can be accurately fixed. Finally, during measurement, the camera 21, the filter, the lens 23, the integrating sphere light outlet, and the sample holder 29 are on the same optical axis, which greatly simplifies the operation for a user.

Various components of the multispectral color image device according to the present invention will be described below in more detail.

Figure 3:
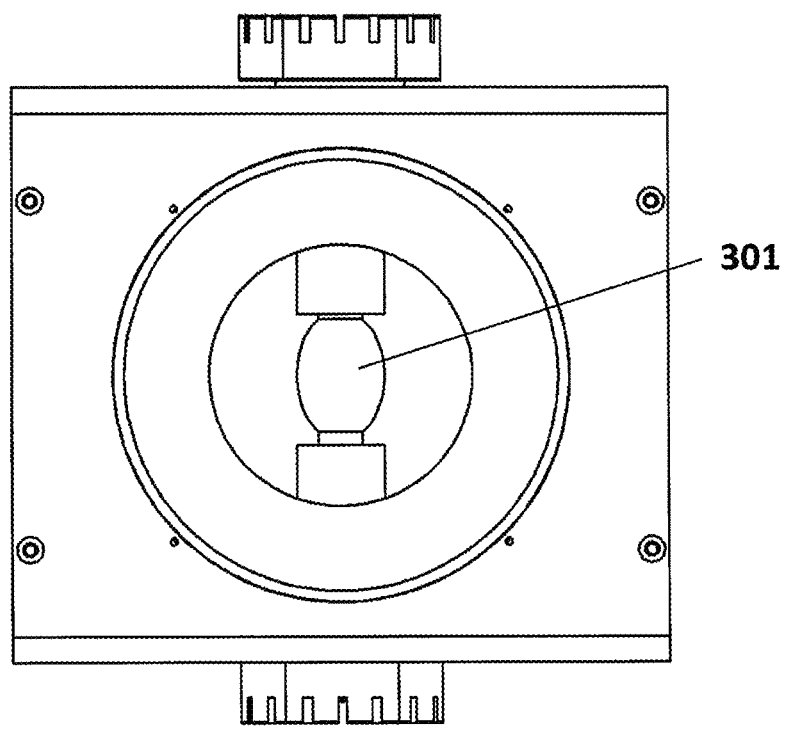
FIG. 3 is a schematic structural diagram of a light source device according to a preferred embodiment of the present invention.

FIG. 3 is a schematic structural diagram of a light source device according to a preferred embodiment of the present invention. As shown in FIG. 3, the light source device includes any suitable light source that emits light and an auxiliary power source therein. As an input part in the light house module, the light source device is mainly composed of a light bulb as a light source 301 and a light intensity collection device to maximize the utilization of light intensity. The light source should be able to radiate a constant and stable spectrum. There are a variety of options for light bulbs in the light house. In this embodiment, an ellipsoidal xenon lamp is used as a light source, which provides light within the wavelength range of 200-2000 nm. Such wavelength range is relatively close to the wavelength range of sunlight, and in this wavelength range the spectrum of each band is relatively stable, which can conveniently simulate the D65 light source so that the colors of the tested object can be more truly displayed. The positive and negative poles of the Xenon lamp are led out by two customized metal electrodes with a heat dissipation function, which improves the fixation between the light bulb and the light house outside thereof, and also provides space for input wiring. A halogen tungsten lamp can also be used as a light source. Compared with the xenon lamp, the spectral distribution of the halogen tungsten lamp is smoother, with no spikes or jitters. However, its spectral band distribution is not as wide as that of the xenon lamps. Generally, the halogen tungsten lamps have high energy in the visible range of 400-700 nm, while radiant energy in the ultraviolet range, such as 300-400 nm, is much lower. Therefore, the halogen tungsten lamp is a good choice for measuring samples that require less UV light. In addition, other light sources, such as metal halide lamps and LED light, can be used based on the tested sample and its corresponding testing requirements.

Figure 4:
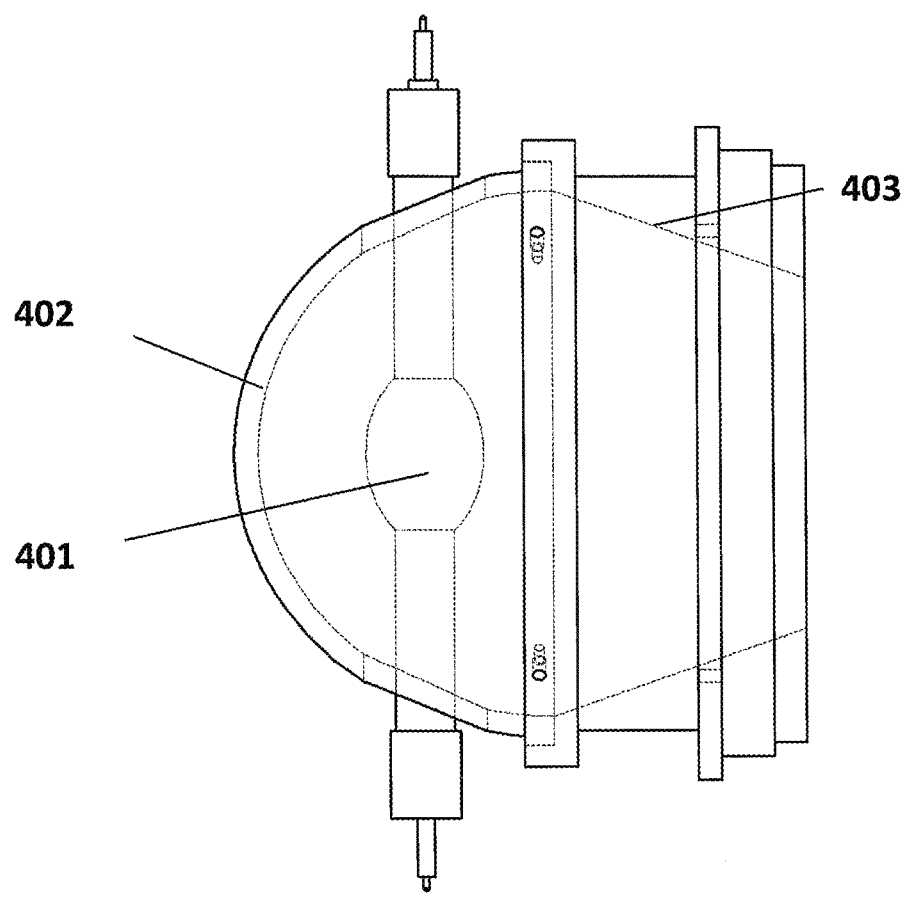
FIG. 4 is a schematic diagram illustrating a light intensity collection device with a porting structure and a double-ended light bulb according to a preferred embodiment of the present invention, where the part indicated by the dotted line in FIG. 4 is located inside the light intensity collection device.
Figure 5:
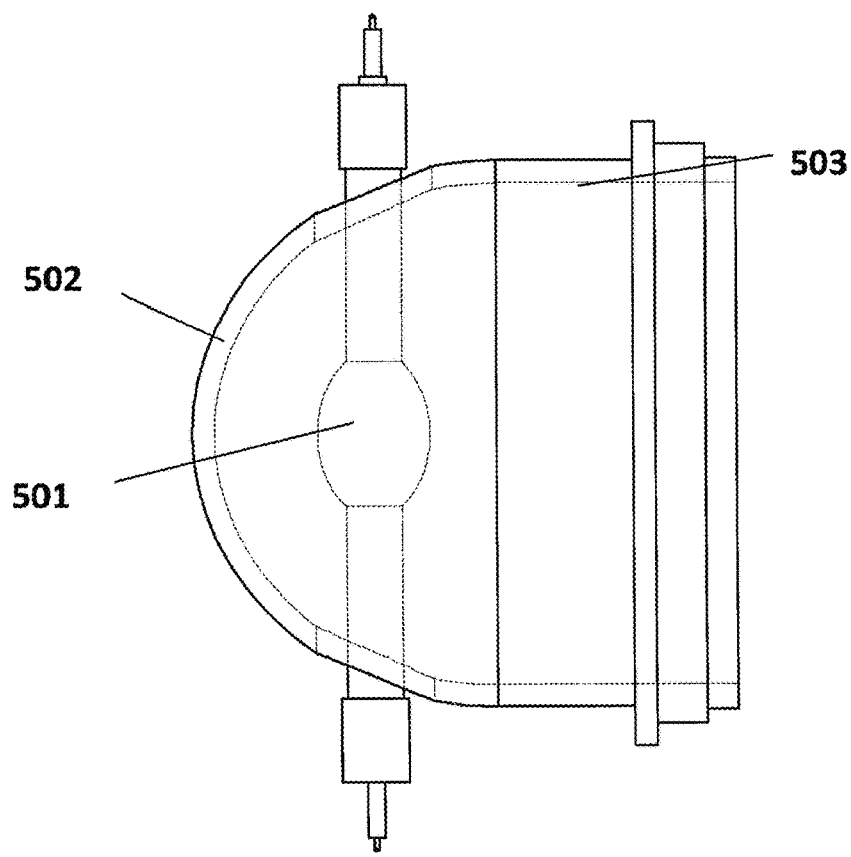
FIG. 5 is a schematic diagram showing a light intensity collection device with a through-port structure and a double-ended bulb according to a preferred embodiment of the present invention.
Figure 6:
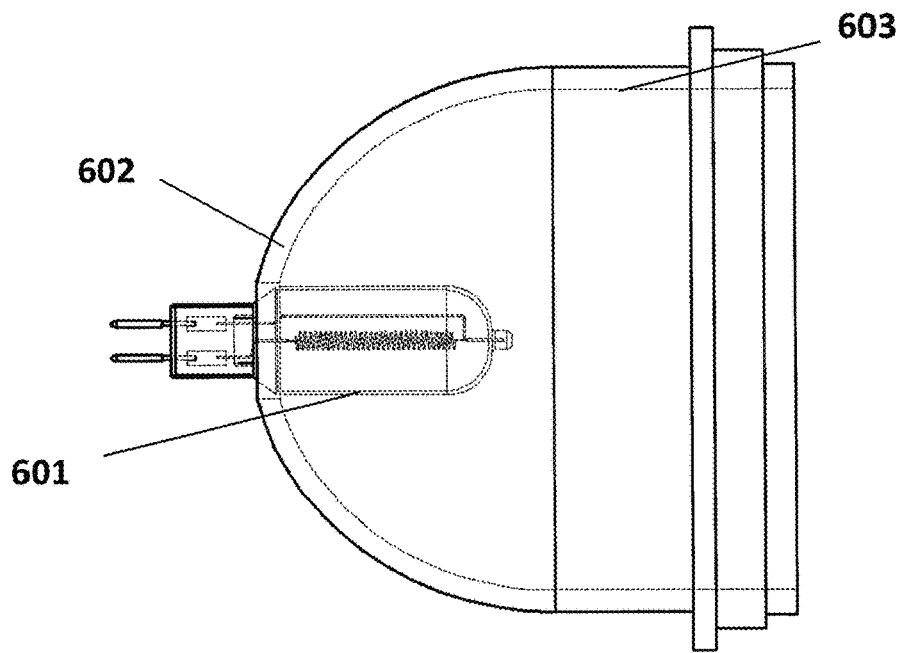
FIG. 6 is a schematic diagram showing a light intensity collection device with a through-port structure and a single-ended lamp tube according to another preferred embodiment of the present invention.

FIGS. 4-6 show three types of light intensity collection devices with light sources, wherein FIG. 4 is a schematic diagram illustrating a light intensity collection device with a porting structure and a double-ended light bulb according to a preferred embodiment of the present invention, wherein the part indicated by the dotted line is located inside the light intensity collection device. As shown in FIG. 4, the light intensity collection device is composed of two parts. The rear part comprises an ellipsoidal-like reflective surface 402, the front part comprises a frusto-conical reflective port structure 403, and the light emitting point of the double-ended bulb is located at the focal point of the ellipsoid. The size of the opening of the portion of the frusto-conical reflective port structure 403 that is farther away from the bulb 401 is smaller than the opening size of the portion that is located closer to the bulb 401 so as to reduce the size of the interface with the integrating sphere. A portion of the light emitted by the light bulb 401 positioned inside the light intensity collection device is emitted from the frusto-conical reflective port structure 403 and the other portion is reflected by the ellipsoidal-like reflective surface 402 and then emitted through the frusto-conical reflective port structure 403. Therefore, when the lighting is enough, the integrity of the integrating sphere can be improved by reducing the interface size between the integrating sphere and the light intensity collection device, which also improves the illumination homogeneity.

FIG. 5 is a schematic diagram showing a light intensity collection device with a through-port structure and a double-ended bulb according to a preferred embodiment of the present invention. As shown in FIG. 5, the light intensity collection device is composed of two parts, wherein the rear part comprises an ellipsoidal-like reflective surface 502, the front part comprises a through-port reflective structure 503, and the light emitting point of the double-ended bulb is located at the focal point of the ellipsoid. A portion of the light emitted from the bulb 501 located inside the light intensity collection device is emitted from the through-port reflective structure 503, and the other portion is reflected by the ellipsoidal-like reflective surface 502 and emitted from the through-port reflective structure 503. The advantage of this light intensity collection device is that it takes full advantage of the radiation of the light source and reflects the light emitted by the light source to the integrating sphere to the maximum extent.

FIG. 6 is a schematic diagram showing a light intensity collection device with a through-port structure and a single-ended lamp tube according to another preferred embodiment of the present invention. As shown in FIG. 6, the light intensity collection device is composed of two parts, wherein the rear part comprises an ellipsoidal reflective surface 602, the front part comprises a through-port reflective structure 603, and the light emitting point of the single ended lamp tube is located at the focal point of the ellipsoid. A portion of the light emitted by the single-ended lamp 601 located in the light intensity collection device is emitted from the through-port reflective structure 603 and another portion is reflected by the ellipsoidal reflective surface 602 and then emitted from the through-port reflective structure 603. Different from the light intensity collection devices shown in FIG. 4 and FIG. 5, the light intensity collection device shown in FIG. 6 places the opening for installing the lamp at the bottom and only needs a small opening for installing the lamp. The advantage of such configuration is that it helps to fix the lamp and helps to ensure the integrity of the light intensity collection device.

The light intensity collection devices shown in FIGS. 4-6 can also use parabolic, spherical structures or the like. The light source can be installed at an appropriate position of the paraboloid, spherical surface or the like to ensure the effective use of the light source. The advantage of installing the light source at the focal point of the ellipsoidal, parabolic surface structures is to maximize the use of light. The light intensity collection devices according to the various preferred embodiments of the present invention shown in FIGS. 4-6 play a very important role in reflecting the light emitted by the light source into the integrating sphere. The common structural features and advantages thereof are as follows.

1) The temperature of the surrounding gas during the running process after the stabilization of the light source can reach several hundreds of Celsius degrees. The material used for the three types of light intensity collection devices as shown in FIGS. 4-6 is metal alloy. As a result, the light intensity collection devices are resistant to high temperature, have good stability, do not tend to turn yellow in long-term exposure to ultraviolet light, are resistant to corrosion under moist environment, have good adhesion, and have coatings that do not fall off easily, do not form wrinkle, and are easy to remove dust stains.

2) The reflective materials for the reflective surface and reflective structure have high reflectivity in the spectral range of 360-700 nm. The reflection efficiency in the 200-350 nm band is higher than that of traditional coatings. Such high reflection efficiency is advantageous to measurement of weak optical signals.

3) The opening of the light intensity collection device is relatively small, ensuring the effective use of light.

As the light input portion of the multispectral color imaging device is based on integrating sphere illumination, the stability of the light source has a direct influence on the accuracy of the final test result. Therefore, requirements for the light source are relatively high. A multispectral color imaging device according to a preferred embodiment of the present invention selects a DC power supply with high precision to provide a stable voltage and current for the light source. The ripple of the output current of the DC stabilized voltage supply can be stabilized below 1%, and the drift after preheating can also be reduced below 1%, so as to ensure the stability of the light intensity of the light emitted by the light source.

Figure 7:
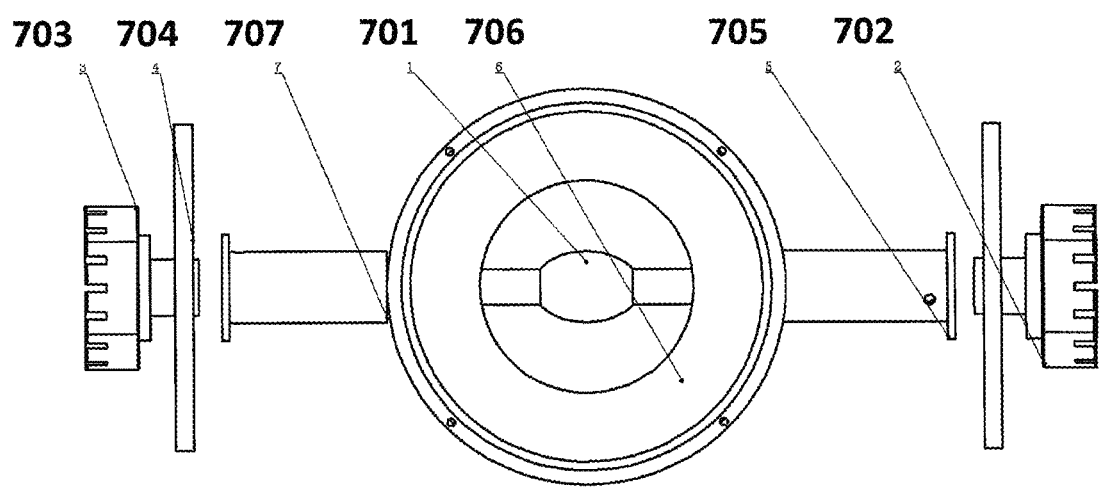
FIG. 7 is a schematic structural diagram of a light source electrode protection device according to a preferred embodiment of the present invention.

In addition, due to the huge instantaneous voltage of the light source, which can reach thousands of volts to tens of thousands of volts or even higher, the light house module also uses a light source protection module to protect the light source. FIG. 7 is a schematic diagram of the light source electrode protection device according to a preferred embodiment of the present invention, which solves the problem that the light bulb cannot be normally lit due to the breakdown discharge phenomenon at initiation. The light source electrode protection device includes an electrode insulating ceramic plate 704, an insulating gasket 705, and an insulating sleeve 707. The light source 701 is a xenon lamp located in the light intensity collection device. The insulating sleeve 707 is connected to the light source 701 at one end thereof, and the other end of the insulating sleeve 707 is connected to the insulating gasket 705. The insulating gasket 705 is connected to the insulating ceramic plate 704, and the insulating ceramic plate 704 is in contact with the self-made positive and negative electrodes 702 and 703, respectively. The electrode insulating ceramic plate 704, the insulating gasket 705 and the insulating sleeve 707 completely separate the bulb electrode from the metal reflective ring 706 to ensure normal and stable operation of the xenon lamp. The installation of the xenon lamp used in the present invention should take the lighting position of the lamp into consideration. For example, if the xenon lamp is lit at a horizontal position, the inclination of the xenon lamp should not exceed 40°, because an arc magnetic field needs to be installed to stablize the arc position if the lamp is lit at a horizontal position, to prevent the arc from floating upwards; if xenon lamp is lit at a vertical position, the anode should be above the cathode. The positions of the anode and the cathode should not be reversed, or else the whole lamp tube will be damaged with the cathode burned in several seconds. In addition, due to high instantaneous turn-on voltage, it is necessary to ensure that the lamp anode and cathode are in tight contact with the self-made positive and negative electrodes 702, 703 so as to avoid the high voltage breakdown of the air caused by the presence of the slit, resulting in a discharge phenomenon, and the lamp cannot be lit, thus affecting lamp life. Furthermore, the high ratio of the ultraviolet light in the light emitted from the xenon lamp can cause damage to a human body, especially eyes, under prolonged exposure to ultraviolet radiation. Therefore, the operators must wear glasses that filter away UV light.

Figure 8:
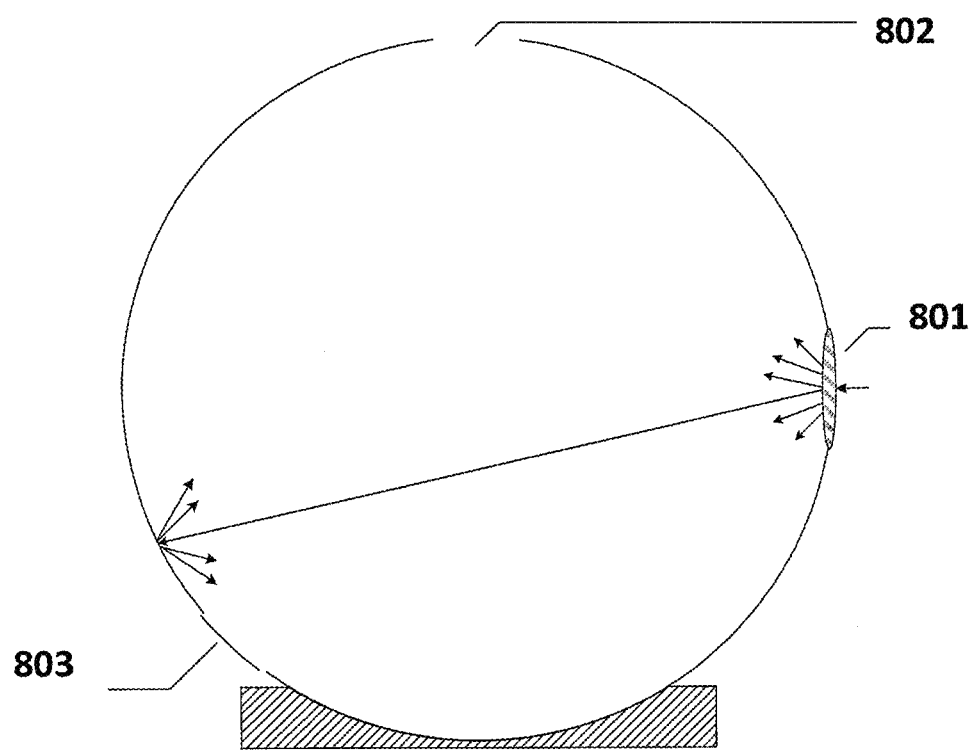
FIG. 8 is a schematic diagram of an integrating sphere according to a preferred embodiment of the present invention.

FIG. 8 is a schematic view of an integrating sphere according to a preferred embodiment of the present invention. In this figure, in order to more clearly depict the optical path, the sample holder 29 as shown in FIG. 2 is omitted. However, for better explanation, the following description is also made in conjunction with FIG. 2. As shown in FIG. 8, an integrating sphere according to a preferred embodiment of the present invention includes three openings: a light inlet 801 on one side of the integrating sphere, a light outlet 802 on the top of the integrating sphere, a sample holder gateway 803 on the other side of the integrating sphere, wherein the sample holder gateway 803 has a guide rail for delivering the sample holder, which can also be a linear slide rail. Light from the light source and light intensity collection device enters the integrating sphere through light inlet 801 and light entering the integrating sphere is reflected by the inner walls of the integrating sphere while light is also reflected by the sample on the sample holder 29. The light reflection pathway is illustrated in FIG. 8, wherein the light entering through the light inlet 801 on the right is scattered in multiple directions and, for example, one light reflected by the inner wall on the left side of the integrating sphere is again scattered in multiple directions, and eventually is emitted through the light outlet 802. The size of the sample holder depends on the resolution of the camera, the focal length of the lens, and the distance between the camera and the surface of the sample holder. The installation of the sample holder inside the integrating sphere maximizes the homogeneity of the surface light source. The sample holder 29 includes a platform portion and a sample frame installed thereto. The sample frame comprises a sample fixing groove and a linear slideway that enters the inner side of the integrating sphere through the sample holder inlet and fix to the inner wall of the integrating sphere. The sample fixing groove can slide along the linear slideway, so that the platform can slide inside the integrating sphere via the sample fixing groove. The sample holder 29 can be directly introduced into the integrating sphere through the sample holder gateway 803 via drawer structure made of a linear slideway or the like, so that the sample on the sample holder can also be delivered into the integrating sphere in this way. Due to the presence of the sample holder gateway 803, a sphere lid portion is preferably positioned at the interface between the sample holder and the wall of the integrating sphere while the sample holder 29 is in alignment with the light outlet, so that the sphere lid portion can cover the sample holder gateway during imaging to maximally ensure the integrity of the sphere surface. Therefore, the preferred embodiment of the present invention can effective utilize the homogeneity of the integrating sphere light source and accurately fix the position of the sample holder.

Figure 9A:
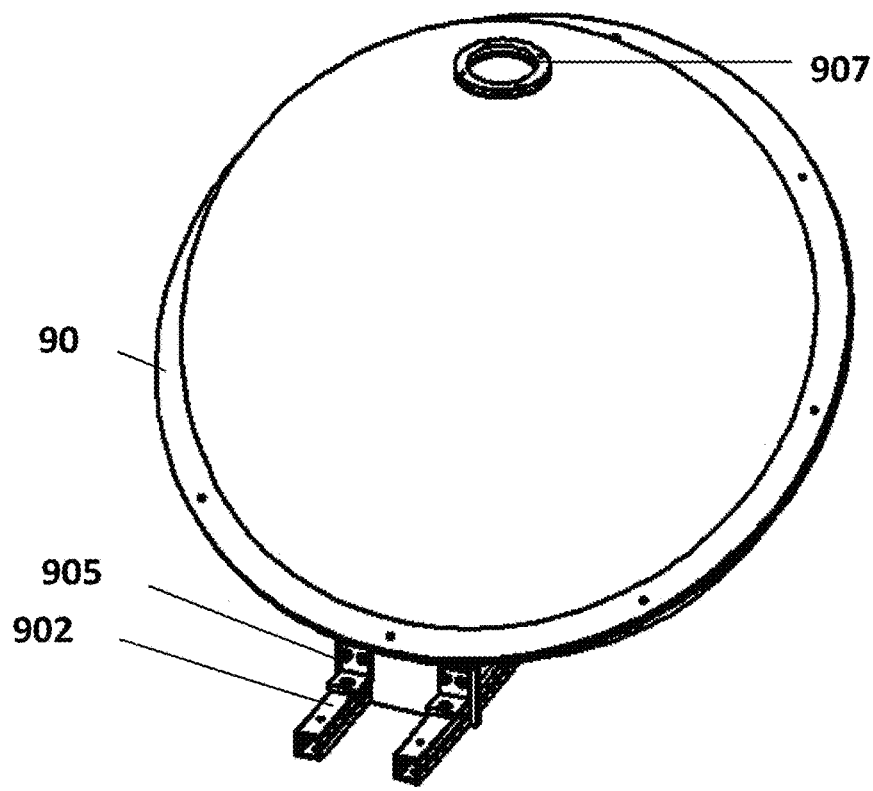
FIG. 9A is a stereo view of an integrating sphere module with a drawer-type sample holder according to a preferred embodiment of the present invention.
Figure 9B:
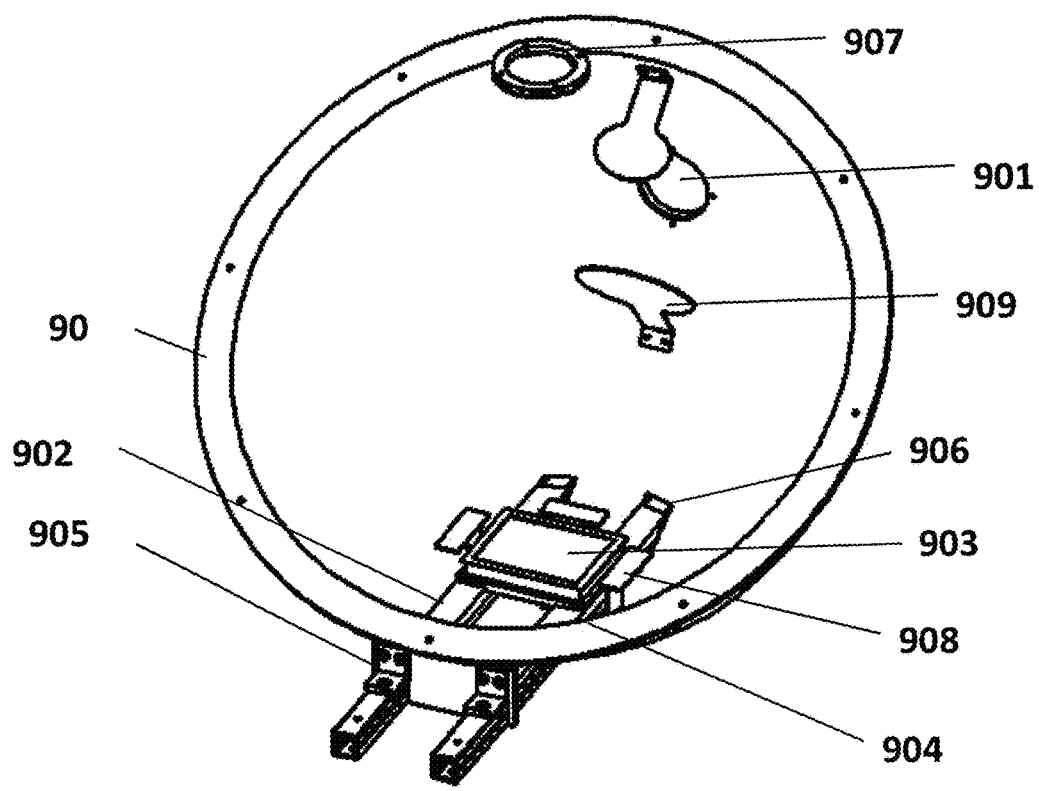
FIG. 9B is a perspective view of the integrating sphere module shown in FIG. 9A.

In addition, the ratio of the light outlet area to the total area of the integrating sphere according to the above embodiments be as follows:

$$\frac{A_{hole}}{A_{sphere}} = \frac{\Sigma \pi r_i^2}{4\pi R^2} \le 0.05,$$

wherein: $A_{hole}$ is the sum of the light outlet area, the light inlet area, and the sample holder gateway area of the integrating sphere, and $A_{sphere}$ is total area of the inner wall of the integrating sphere; for $r_i$, i=1, 2, 3, i.e., $r_i$ is $r_1$, $r_2$, $r_3$, wherein $r_1$, $r_2$, $r_3$ are radii of the light outlet, light inlet, and sample holder gateway, respectively; R is the radius of the integrating sphere. The opening of the integrating sphere should be as small as possible, to ensure the homogeneity of the light intensity distribution inside the integrating sphere. FIGS. 9A-9B are a stereo view and a perspective view of an integrating sphere module with a drawer-like sample holder according to a preferred embodiment of the present invention. As shown in FIG. 9A-B, the internal structure of the integrating sphere 90 includes a light inlet, a light outlet, a light blocking sheet and a drawer-like sample holder. A light blocking sheet 909, such as one, two or more light blocking sheets, may be provided near the light inlet 901 to block direct light so as to prevent incident light from directly entering the lens in the filter wheel module or directly irradiating the surface of the sample holder. The drawer-like sample holder includes a linear slideway 902 fixed to the integrating sphere and a sample fixing groove 904. The linear slideway 902 is formed of three sections of slideways, wherein the bottom section is fixed to the mounting hole 906 inside the integrating sphere, and the top section is connected to the sample fixing groove 904. Thus, the sample fixing groove 904 can slide along the linear slideway 902 to form a slidable drawer-like structure. The sample holder 903 moves as the slide of the sample fixing groove 904 along the linear slideway 902. Calibration white blocks 908 are also mounted on the side of the sample holder 903 for automatic calibration based on the reference reflective surface. The integrating sphere further comprises a base (not shown), to which the linear slideway 902 is fixed. The linear slideway 902 may also be fixed to the base by a bezel portion 905 of the base, and the bezel portion is located outside the linear slideway 902 for stabilizing the integrating sphere fixed rail and covering the sphere lid portion at the sample holder gateway of the integrating sphere. The sample holder 903 is platform-shaped or any other suitable shape, and is located on the sample fixing groove. A sample is placed above the sample holder 903. When placing, retrieving and replacing the sample, the sample holder 903 enters and leaves the integrating sphere via the drawer-like structure. After the sample holder 903 is pushed into the integrating sphere 90, it is located at the bottom center of the integrating sphere 90 and is located on the same vertical line as the light outlet 907. The bottom of the sample holder 903 can be equipped with a magnet (not shown), and the surface of the sample holder 903 can have a metal frame of a similar size to ensure that the sample under test does not fall into the integrating sphere.

The integrating sphere according to a preferred embodiment of the present invention can also selectively include adjusting elements at the light outlets of the integrating sphere based on actual requirements, for adjusting the size of the light outlets.

Figure 10:
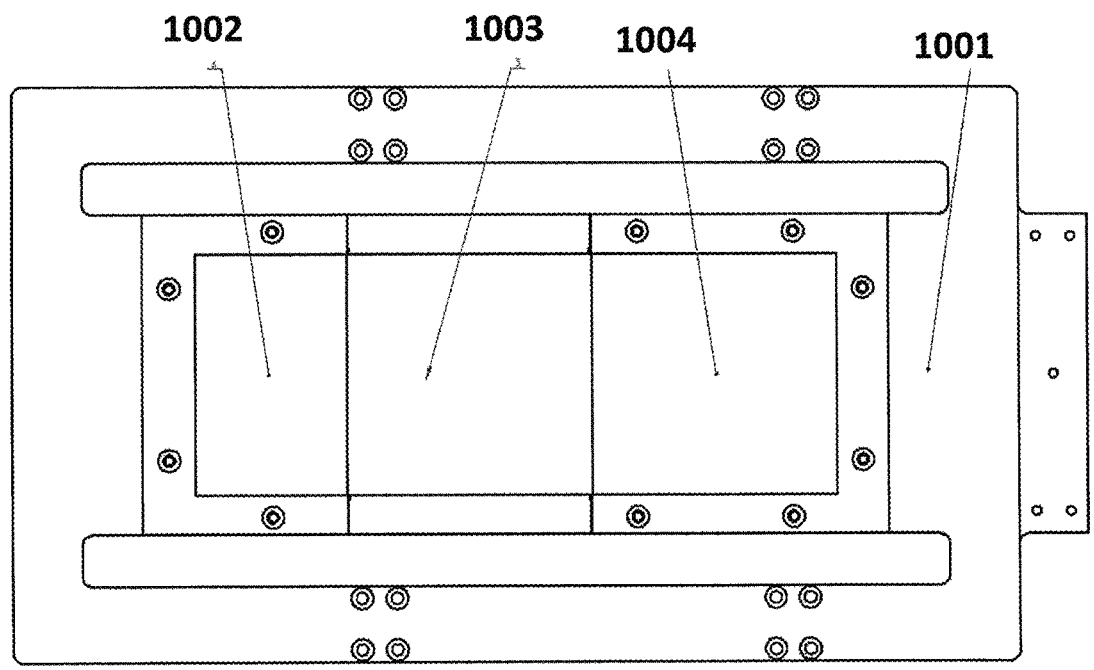
FIG. 10 is a schematic diagram of the mounting of the filter holder of the ultraviolet light filtering module according to a preferred embodiment of the present invention.

FIG. 10 is a schematic view of the filter holder of the ultraviolet light filtering module according to one embodiment of the present invention. The purpose of the UV light filter module is to change the ratio of the UV light and the visible light so as to change the lighting conditions for measurement. The ultraviolet light filtering module includes an ultraviolet filter holder 1001 having a hollow outer frame portion for mounting a filter therein. The UV light filtering module includes two kinds of filters, that is, the UV bandpass film 1002 and the UV cut-off film 1004, which work together with the all-pass film 1003. The ultraviolet bandpass film 1002 is a filter that only allows the ultraviolet light to pass through, and can control the ratio of the visible light to the ultraviolet light in the incident light source by weakening the visible light. The ultraviolet cut-off film 1004 is used for filtering the ultraviolet light so that the incident light includes only visible light. These two types of filters are used to adjust the ratio of the UV light to visible light so as to provide different lighting conditions. The ultraviolet filter holder of the ultraviolet light filtering module can automatically and stably moved by the coordination between the motor and the sliderails. The ultraviolet filter holder is installed on the two guiderails, which have threaded screws in the middle thereof to connect to the filter holder, and thereby moving the filter holder along the sliderail using the motor. The ultraviolet light filtering module further comprises an electronic control device, which comprises a stepper motor controlled by a programmable driver, two limit switches to limit positions, two guide rails for fixing the frame of the ultraviolet light filters, and a screw. The rotation of the screw driven by the motor leads to a smooth movement of the ultraviolet filter holder. The UV light filtering module may be a separate component, with, for example, a housing encompassing the UV filter holder, the filters, the motor, and the slide rail therein, and/or the UV light filtering module may be connected with the light house module.

Figure 11:
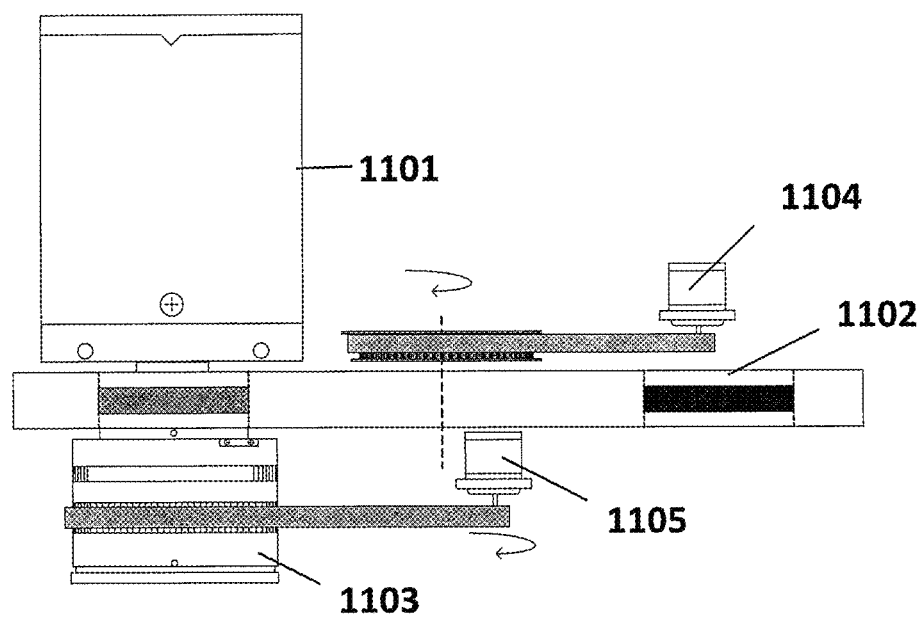
FIG. 11 is a schematic diagram of the overall structure of a filter wheel module including a camera, a lens and a filter wheel according to a preferred embodiment of the present invention.

FIG. 11 is a schematic view of the overall structure including a camera, a lens and a filter wheel according to a preferred embodiment of the present invention. As shown in FIG. 11, the core module of the multispectral color imaging device mainly includes a CCD camera 1101, a filter wheel 1102 and a lens 1103. The stepping motor 1104 rotates the filter wheel 1102 so that the filter of one of the channels of the filter wheel 1102 is located between the CCD camera 1101 and the lens 1103 and the sensor center of the CCD camera 1101, wherein the center of the lens 1103, and the center of the filter of a certain channel of the filter wheel 1102 are always on a straight line. The stepping motor 1105 can drive the lens 1103 to rotate so as to realize the automatic focusing of the lens 1103. The connection mechanism of the CCD camera 1101, the filter wheel 1102, and the lens 1103 will be described in detail below with reference to the embodiment of FIG. 12. The specific structure and operation of the filter wheel 1102 will be described in detail below with reference to the embodiment of FIG. 16.

Figure 12:
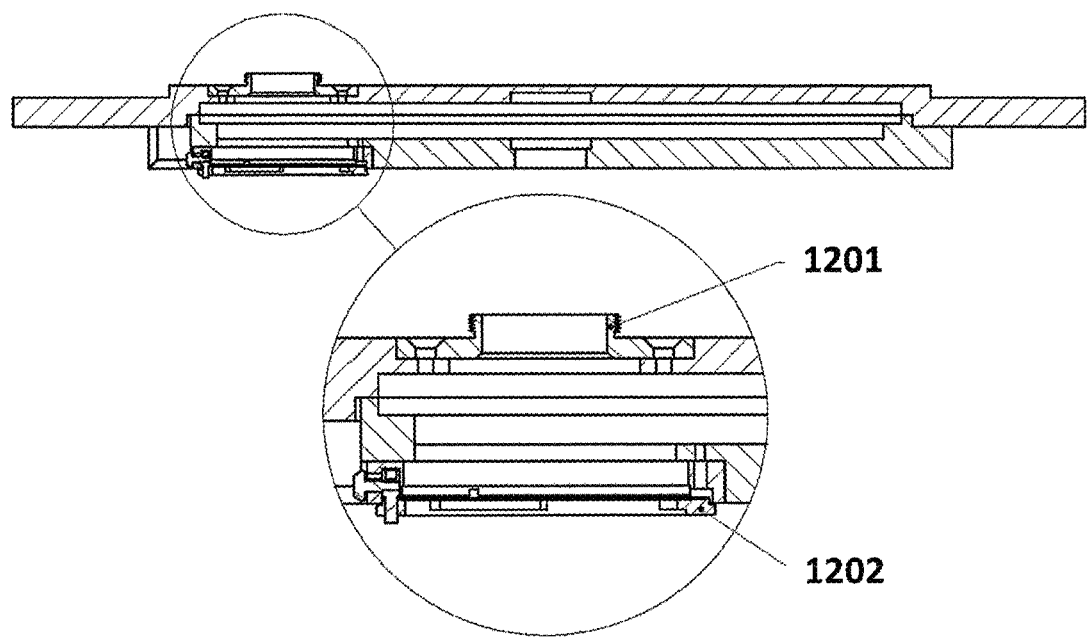
FIG. 12 is a schematic structural view and a partially enlarged view of a camera port to lens port conversion according to an embodiment of the present invention.
Figure 15:
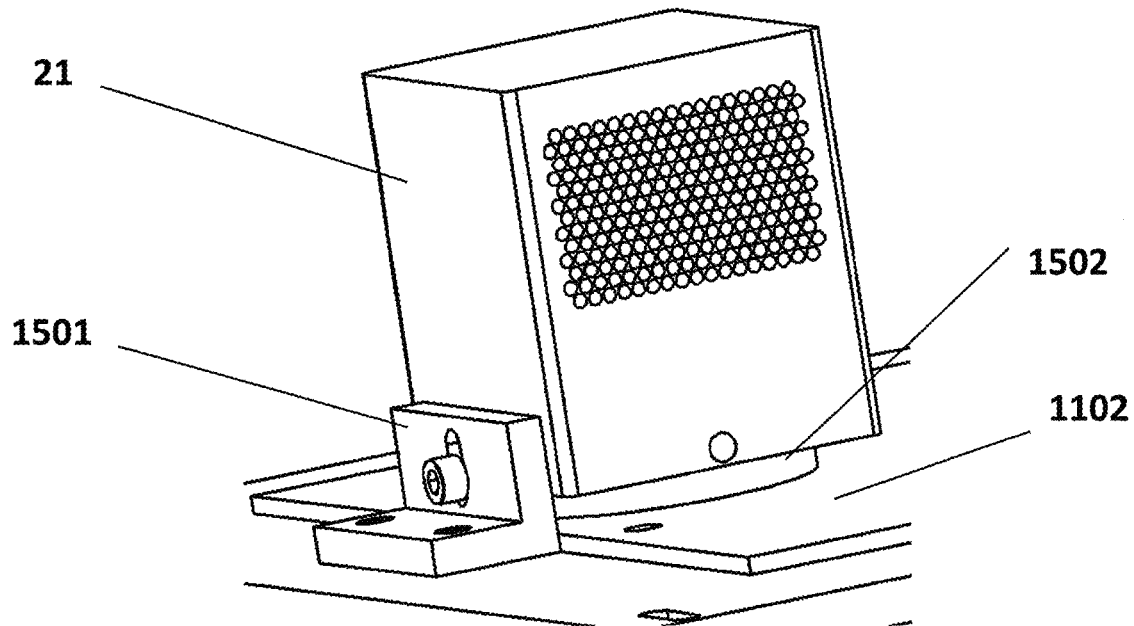
FIG. 15 is a schematic structural diagram of the connection between a camera and a filter wheel through a triangle element according to an embodiment of the present invention.

FIG. 12 is a schematic structural view and a partially enlarged view of a camera to lens conversion port according to an embodiment of the present invention; FIG. 15 is a schematic structural view of a camera and a filter wheel connected by a triangular member according to an embodiment of the present invention. As shown in FIG. 15, a camera according to one embodiment of the present invention is a camera having a standard port. The camera (not shown) is connected to a protruded port 1201 of the upper cover of the filter wheel, that is, the camera fixing thread port. The port for the camera can be a C port. The camera can be fixed to the upper cover of the filter wheel by a triangular member located on the outside of the camera as shown in FIG. 15. As shown in FIG. 15, the triangular member 1501 is connected to the camera, and the camera is connected to the upper cover of the filter wheel through the interface portion 1502. The lens according to an embodiment of the present invention is an optical lens (not shown), for example, an F-port optical lens, which is connected to the lens port 1202 of the lower cover of the filter wheel through a bayonet interface board. The lens can be a fixed-focus or zoom lens with an appropriate focal length, and the optimal distance between the fixed position of the lens and the light outlet of the integrating sphere is 2-5 times the diameter of the opening of the integrating sphere.

Figure 13:
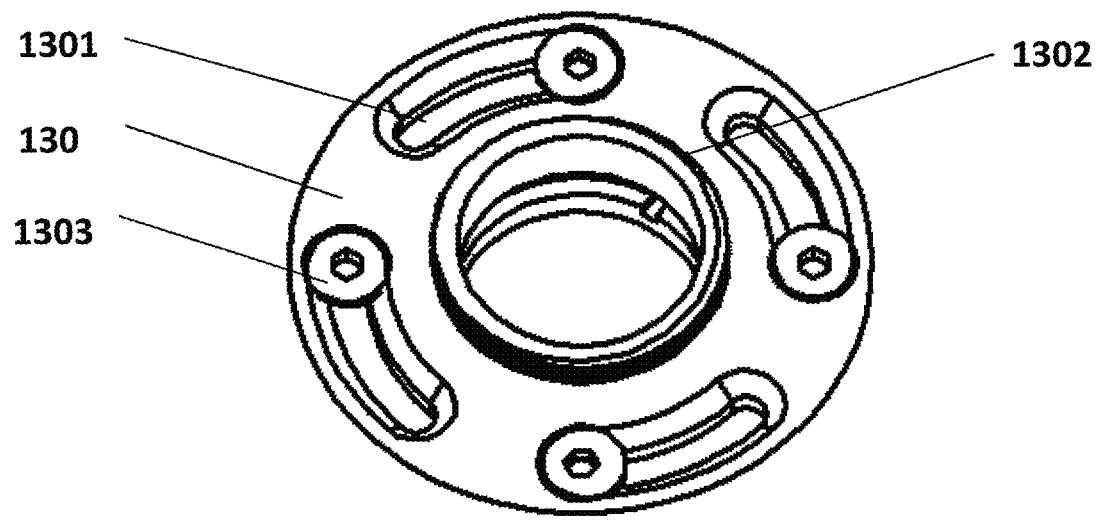
FIG. 13 is a schematic structural diagram of a camera port on an upper cover of a filter wheel according to an embodiment of the present invention.

FIG. 13 is a schematic diagram of a camera interface at the upper cover of the filter wheel according to an embodiment of the present invention. As shown in FIG. 13, the camera interface 130 includes a centrally located and hollow annular protrusion 1302 for hermetically connecting with a corresponding interface of the camera so that the camera may be fixed to the upper cover of the filter wheel and receive images from the hollow portion. The annular protrusion 1302 may have thread on its outer surface. The mounting portion 1301 is located on the upper cover of the filter wheel at the outer ring relative to the annular protrusion for adjusting the mounting direction of the camera interface 130 to finally adjust the mounting direction of the camera chip, so as to ensure the imaging direction of the camera.

The camera interface is stuck into the upper cover of the filter wheel through a snap element 1303.

Figure 14:
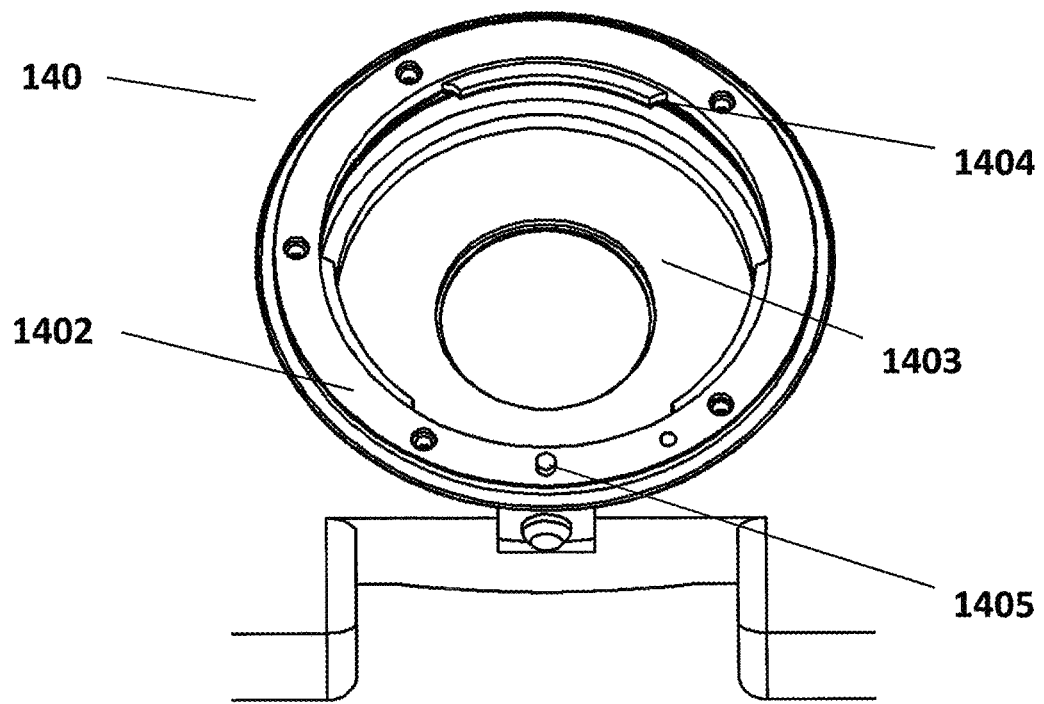
FIG. 14 is a schematic structural diagram of a bayonet interface on a lower cover of a filter wheel according to an embodiment of the present invention.

FIG. 14 is a schematic structural diagram of a bayonet interface for connecting a lens located on a lower cover of the filter wheel according to an embodiment of the present invention. The bayonet interface plate has a mounting portion and a bayonet interface. The mounting portion is connected to the lower cover of the filter wheel, and the bayonet interface 140 includes a hollow bottom plate portion 1403 located at the bottom, an outer wall interface portion 1402, an inner wall located at the inner side of the outer wall interface portion and along interface circumference, and a guide chute 1404 on the inner wall. The guide chute has discontinuous chute wall. The bayonet interface may further comprise a spring pin 1405 located along the circumference of the outer interface portion, and the spring pin may also be provided in plurality. A bayonet is disposed on the outer peripheral wall of the lens (not shown). The bayonet includes an outer wall, a guiding portion on the outer wall capable of cooperating with the guiding chute 1404, and a protrusion located on one side of the bayonet. When the lens is mounted on the filter wheel, the outer wall of the bayonets of the lens and the inner wall of the bayonet interface of the filter wheel are sealingly connected with each other, and the guide portion enters the guide chute from the gap of the discontinuous chute wall and moves along the guide chute until reaching the desired position. The spring pin 1405 is engaged with the pocket portion on the lens, so that the lens is locked and no longer moves. As such, the lens does not rotate relative to the filter wheel while refocusing. The refocusing of the lens can be driven by a motor through connecting the transmission with the refocusing element. Thus, the lens bayonet is seamlessly and stably fixed to the filter wheel. The bayonet can firmly fix the lens to ensure that the lens will not fall off during use. Seamlessly connecting the camera, the upper cover of the filter wheel, the filter mounting bracket, the lower cover of the filter wheel and the lens from top to bottom results in the direct encapsulation of the filter, avoiding the adverse effect from the dust when exposed to the air on the precision of the imaging system. The above-disclosed method is applicable to the C—F type camera bayonet structure. Of course, the interface conversion can be realized using other similar structures for other mount type of lenses (such as S-mount and R-mount).

Figure 16:
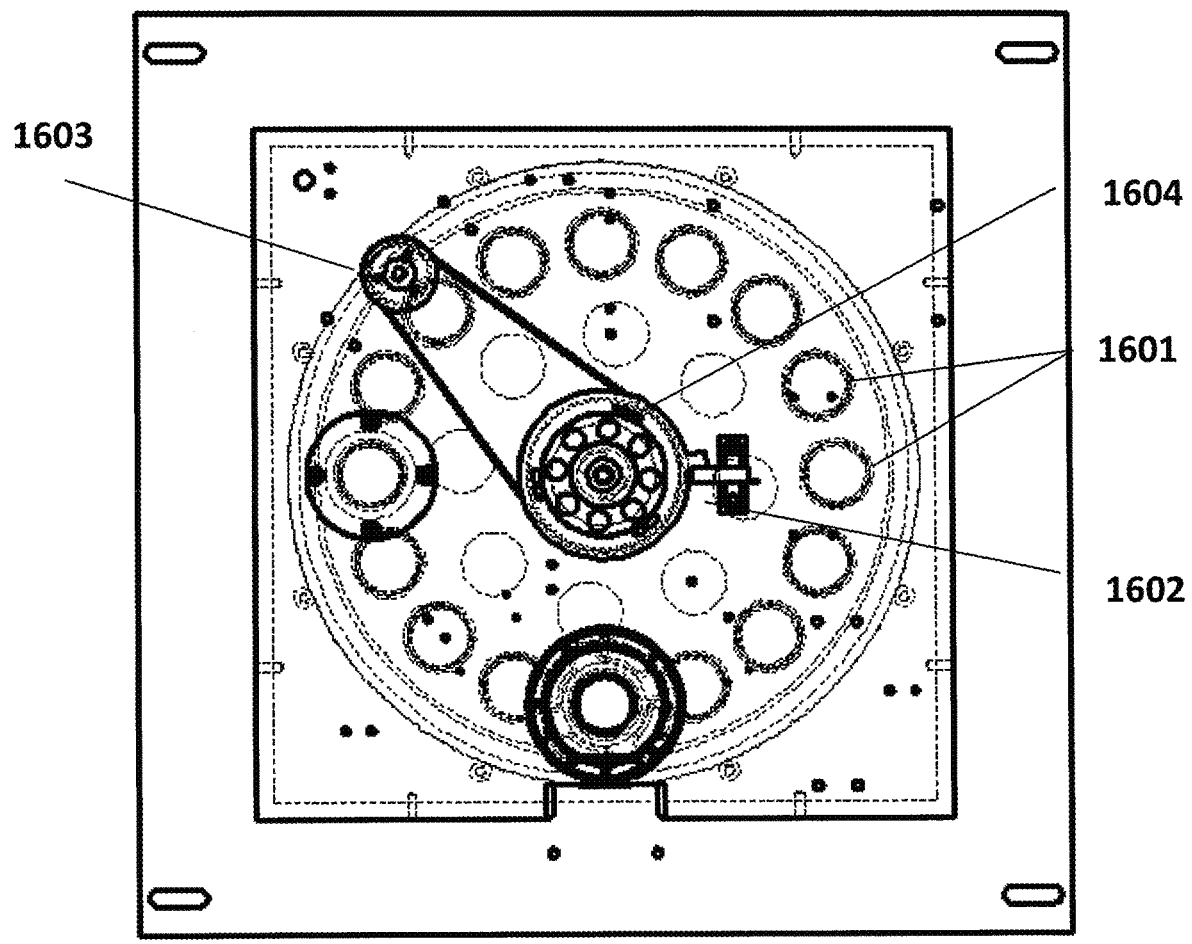
FIG. 16 is a schematic diagram of a filter mounting rack rotating structure of a filter wheel according to a preferred embodiment of the present invention.

FIG. 16 is a schematic diagram of the rotation structure of the filter mounting bracket of the filter wheel according to a preferred embodiment of the present invention. As shown in FIG. 16, the optical filter in this embodiment is a narrow-band optical filter, and may also be other types of optical filters. The rotation structure of the filter mounting bracket includes sixteen narrow-band filter mounting grooves 1601, so that the narrow-band filters can be continuously and closely arranged in the peripheral region of the rotating rack of the filter wheel. The mounting wavelength of the narrow-band filter can be 5 nm, 10 nm, 20 nm, or other wavelengths. These filters allow light of a particular wavelength to pass through the corresponding filter. In the present invention, light passing through different regions of the used wavelength-selective narrow bandpass filters can have a spectrum with a bandwidth of 20 nm centered at 400 nm, 420 nm, 440 nm, 460 nm, 480 nm, 500 nm, 520 nm, 540 nm, 560 nm, 580 nm, 600 nm, 620 nm, 640 nm, 660 nm, 680 nm and 700 nm. In addition, the present invention can also use 31 filters with a bandwidth of 10 nm, and the only modification is to modify the rotating rack of the filter wheel in order to have 31 mounting grooves. Other forms of filter selection are also possible.

The filter wheel module further comprises a filter rotating frame, an upper cover plate and a lower cover plate for encapsulation, wherein the rotating frame has a plurality of filter slots and a plurality of holes (i e channels) for reducing the rotation load. The rotating structure of the filter mounting frame is led out to the synchronizing wheel of the lower cover plate of the filter wheel via a rotating central axis and controlled by a stepper motor controlled by a programmable driver. The rotation of the synchronizing wheel 1604 is driven by a driving wheel 1603 through a belt. The edge of the synchronizing wheel 1604 is provided with a photoelectric sensor 1602 for position detection. The photoelectric sensor 1602 determines the rotation position of the synchronizing wheel and the corresponding rotation step length, so as to precisely control the rotation of the filter wheel.

The specific working process of the rotating structure of the filter mounting bracket is that when the filter wheel is initialized, the stepper motor drives the control module to control the rotation of the synchronizing wheel by the stepper motor until the light blocking piece on the synchronizing wheel enters the trigger position of the photoelectric sensor. At this time, the photoelectric sensor sends out signals to the driving control module of the stepper motor, and after the driving control module of the stepper motor receives the signals from the photoelectric sensor, the driving control motor continues controls the stepper motor to rotate the synchronization wheel to a certain distance and then stop. During this process, the trigger position of the photoelectric sensor needs to be precisely measured, so that when the synchronizing wheel stops, the center of the filter of a channel, the center of the camera C interface of the upper cover of the filter wheel, and the lens F interface of the lower cover of the filter wheel are on the same line. During normal image acquisition, the stepper motor drives the synchronizing wheel to rotate by a fixed step, and after each stop, the filter of the corresponding channel stops in front of the camera sensor, and at this time the image captured by the sensor is a multispectral image of 16 channels, 31 channels or other numbers of channels. The camera converts the light signal projected to the focal plane of the sensor into digital signal through a CCD sensor or a CMOS sensor built-in A/D converter, resulting in spectral channel images.

Figure 17:
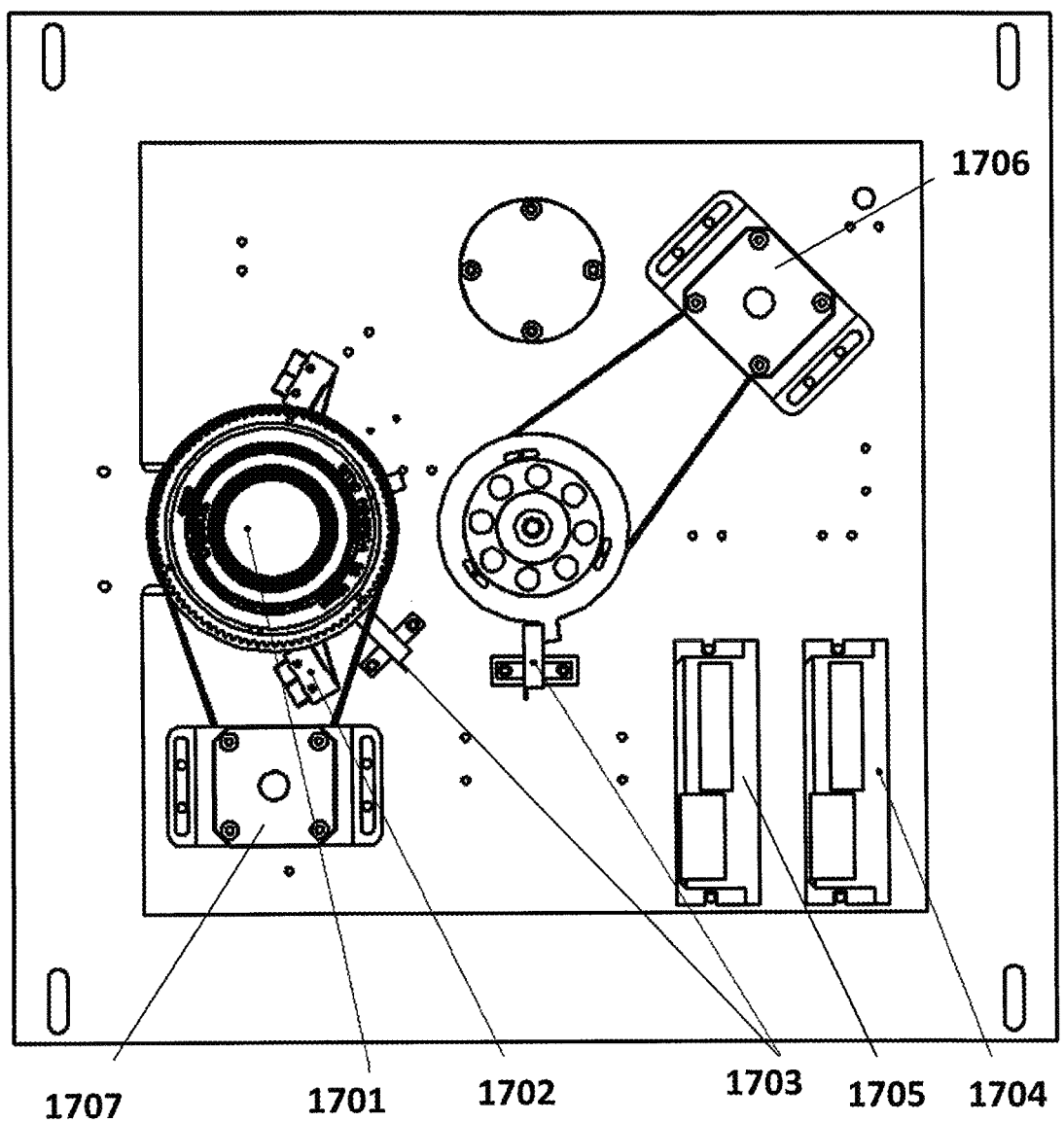
FIGS. 17 and 18 are schematic structural diagrams of the spatial distribution in two directions of the integrated filter wheel module electronic device according to a preferred embodiment of the present invention.
Figure 18:
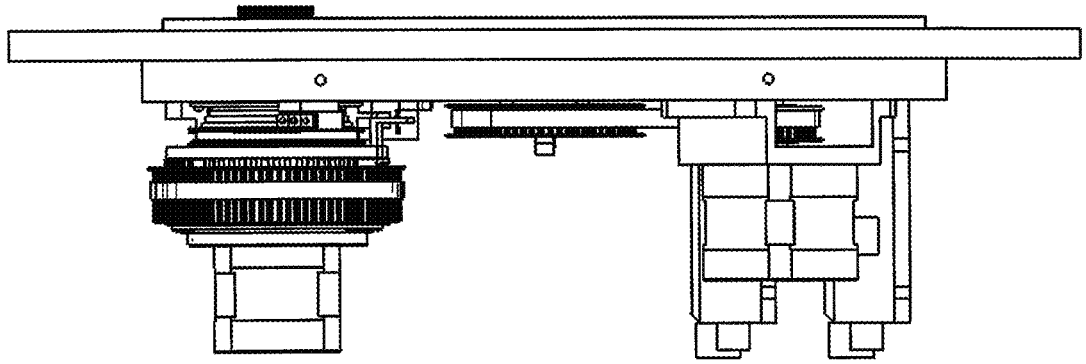

FIG. 17 and FIG. 18 are schematic structural diagrams of the spatial distribution of the integrated filter wheel module electronic device in two directions according to a preferred embodiment of the present invention. As shown in FIGS. 17 and 18, all electronic control devices of the filter wheel module are mounted on the lower cover of the filter wheel. The motor drive control module 1704 controls the stepper motor 1706 to drive the rotation of the filter holder. Another motor drive control module 1705 is for the motor 1707 that controls the auto-focusing of the lens. The two photoelectric sensors 1703 control the rotation position of the synchronizing wheel of the filter frame and the synchronizing wheel of the lens respectively. The micro-motion limit switch 1702 and another micro-motion limit switch opposite thereto ensure that the lens 1701 does not fall off or be damaged due to the abnormal rotation of the stepper motor during the focusing process. Preferably, the motor drive control modules 1704, 1705 may be connected to a computer through an RS232 serial port. To go beyond the limitations of the computer interface, in this embodiment, the USB port of the computer may be converted into a plurality of RS232 protocol communication serial ports through a USB-to-RS232 converter, to achieve the control of different motor controllers.

Figure 19:
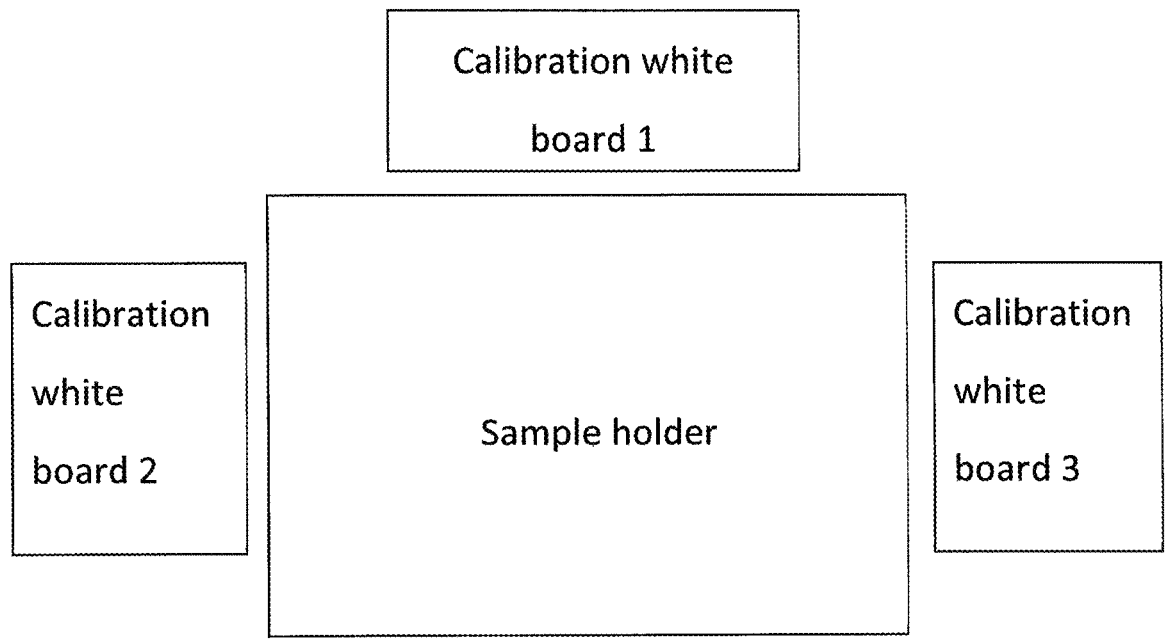
FIG. 19 is a schematic diagram of the spatial distribution of standard white blocks for reference reflection surface-based automatic calibration according to a preferred embodiment of the present invention.

FIG. 19 is a schematic diagram of the distribution of standard white blocks for automatic calibration based on a reference reflection surface according to a preferred embodiment of the present invention. In traditional multispectral imaging devices, the secondary reflections of the light source affect the accuracy of the measurements. This problem persists in the system of integrating spheres, and even more serious since each point of the inner wall of the integrating sphere has a higher reflectivity. In order to solve the problem of the influence of the secondary reflection and the fluctuation of the light in the lighting process of the xenon lamp, an automatic calibration method based on a reference reflection surface is incorporated to this embodiment. As shown in FIG. 19, three calibration white blocks are added around the sample holder. The standard luminance values of the calibration white blocks are recorded during the step of the whiteboard illumination balancing. During imaging acquisition, the camera simultaneously collects the real-time brightness value of the calibration white blocks. Following this, the automatic calibration based on a reference reflective surface is performed according to the equation as below:

$$I_{pixel0} = I_{pixel} \cdot \frac{I_{patch0}}{I_{patch}} \qquad (3)$$

where, $I_{pixel0}$ represents the brightness value of a corresponding pixel after calibration, $I_{pixel}$ represents the brightness value of this pixel detected by the camera in real scenario, $I_{patch0}$ represents the standard brightness value of calibration white blocks (stored during the step of the white block illumination balancing), and $I_{patch}$ represents the real-time brightness value of the white blocks during the imaging capture of the pixel.

Existing calibration methods do not consider the change of the illumination intensity with time and the test sample. In this embodiment, the automatic light intensity calibration method has an additional step for obtaining real-time light intensity to monitor the light intensity, which increases the stability and precision of the imaging system.

Figure 20:
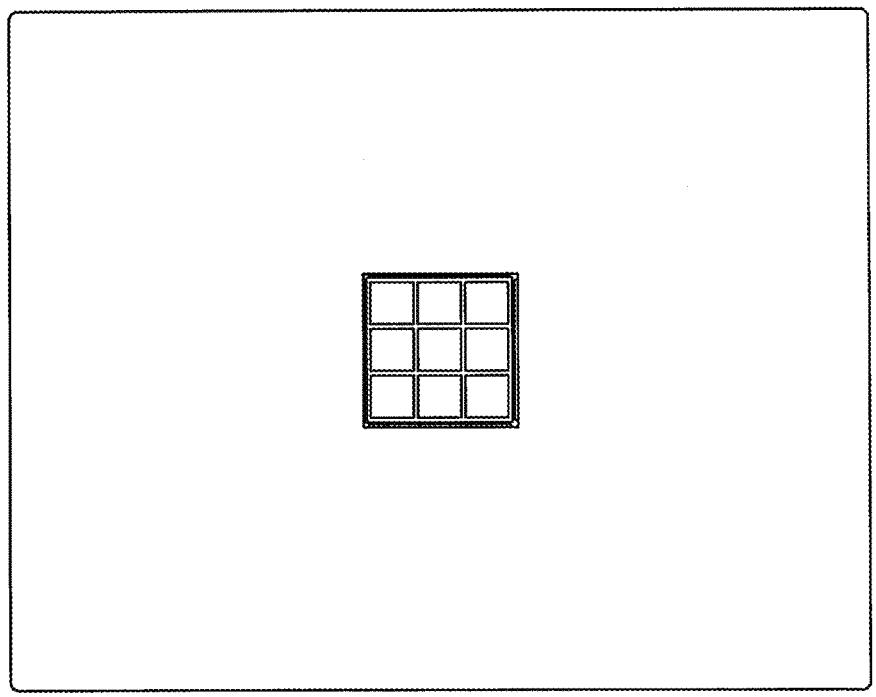
FIG. 20 is a schematic diagram of a calibration plate for further eliminating background effects with a monochromatic sample according to a preferred embodiment of the present invention.

FIG. 20 is a schematic illustration of a calibration plate further eliminating background effects with a monochromatic sample according to a preferred embodiment of the present invention. As shown in FIG. 20, the center of the calibration plate is fixed with a color card with 9 different colors arranged in small patches of 3×3. These 9 different colors can maximize the spectral distribution, such as red, yellow, green, orange, blue, purple, gray, brown, and black. In real scenarios, the background board of different colors is placed on the calibration plate of the sample holder during measurement to broaden the selection of background colors. The number of background colors is most preferably 7-15. The spectral response values of 9 colors of the center were collected and the model is established for the response value of each channel, according to the equation below, $$r_{std} = (a_1 \cdot \text{ratio} + a_2)(r_{bat} + a_3) + a_4 \qquad (4)$$

where, $r_{std}$ represents the standard response value of a color block at its channel, and the response value measured at the brightest background was taken as a base in the actual test; ratio represents the correction coefficient based on the reference reflection surface of the corresponding channel, and is given by the $I_{patch0}/I_{patch}$ of the equation (3); $r_{bat}$ represents the obtained normalized camera response value; $a_1$~$a_4$ are the model coefficients to be obtained.

The method for eliminating the background effect according to a preferred embodiment of the present invention includes the following steps: collecting spectral response values of a plurality of color blocks on a background board on a sample holder; analyzing the spectral response values, establishing a mathematical model for the response values and obtaining model coefficients; real-time correcting the spectral response values obtained from the subsequent real-time imaging based on the mathematical model and the coefficients.

Figure 21:
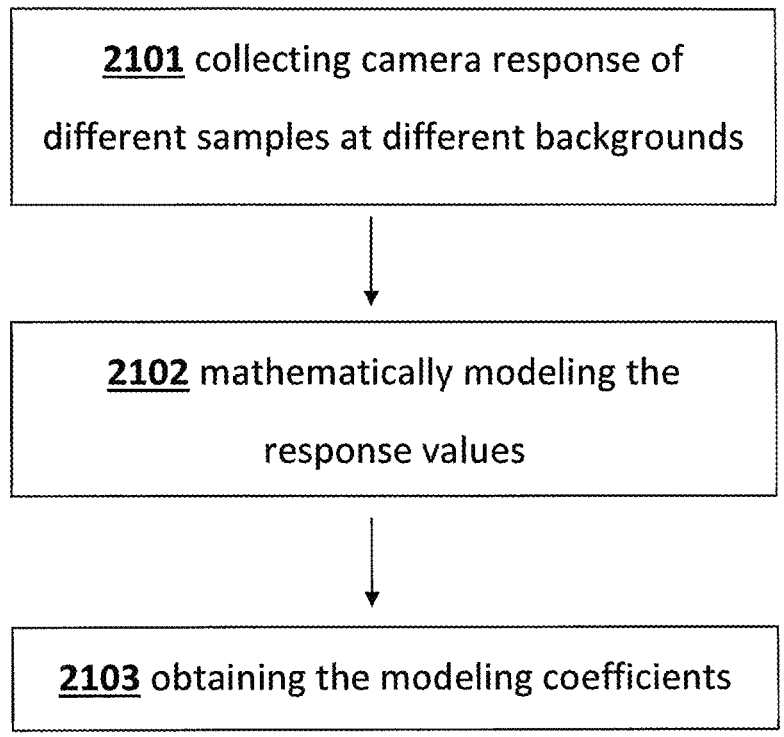
FIG. 21 is a block diagram of a calibration process to eliminate background effects according to a preferred embodiment of the present invention.

When performing the background effect elimination correction, as shown in FIG. 21, the calibration process is performed first. In step 2101, camera responses of different samples are collected. In step 2102, the measured response values are mathematically modeled. In step 2103, the model coefficients are obtained. Specifically, a plurality of response values of a certain color in a plurality of backgrounds is measured when the background influence elimination correction of a certain channel is performed. The response value in a certain background is set as the standard response value $r_{std}$, and the standard response value is generally determined by the response value measured in the brightest background. Following this, such measurement is repeated for multiple color blocks to obtain a number of standard response values. $r_{bat}$ is the normalized value of the camera response value obtained from test of the color block in other backgrounds, and $a_1$~$a_4$ is the model coefficient to be obtained; ratio=$I_{patch0}/I_{patch}$, $I_{patch0}$ is the standard brightness values of small white blocks obtained during illumination balancing, $I_{patch}$ is the brightness value of small white blocks obtained in actual test, and the $I_{patch0}$ and $I_{patch}$ are obtained using the method described above; the response value $r_{bat}$, ratio, and standard response value $r_{std}$ obtained during imaging are substituted into the aforementioned equation to obtain $a_1$~$a_4$. The correction coefficients are thus obtained according to the process described above and recorded.

Figure 22:
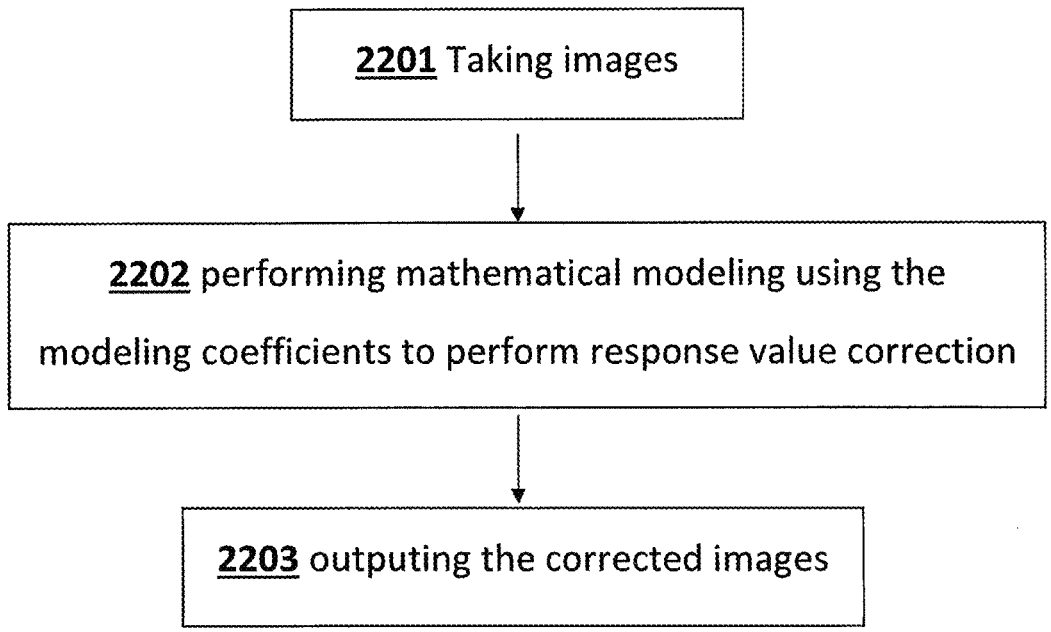
FIG. 22 is a block diagram of a process of eliminating background effects according to a preferred embodiment of the present invention.

In the formal image acquisition, the coefficients $a_1$~$a_4$ are called for the background correction of the image, and these coefficients are obtained from the equation (4) above, wherein, $r_{std}$ is the calculated camera response value of a sample after background correction, ratio=$I_{patch0}/I_{patch}$, $I_{patch0}$ is the standard brightness values of small white blocks obtained during illumination balancing, $I_{patch}$ is the brightness value of small white blocks obtained in actual test; $r_{bat}$ is the normalized value of the camera response value obtained real-time from formal image acquisition without correction, and $a_1$~$a_4$ are the known model coefficients obtained during background effect elimination. As shown in FIG. 22, in step 2201, an image is captured, step 2202, modeling is performed with model coefficients, and the camera response value is corrected. In step 2203, the corrected image is output. Specifically, the sample on the sample holder is firstly imaged and a sample image is obtained, and the normalized camera response value $r_{bat}$ is also obtained. After this, the equation (4) and the standard response value and model coefficients $a_1$~$a_4$ are used to obtain the corrected response value $r_{std}$, so as to eliminate the background effect.

The existing correction methods do not consider the existence of multiple reflections that leads to effect of different colors on true results of other colors during measurement. The background elimination correction of the present disclosure takes the effect of multiple reflection into consideration and starts form camera response value and models to each multispectral channel, so as to achieve background effect correction. The background effect correction using a monochromatic sample is not included in the present disclosure.

Figure 23:
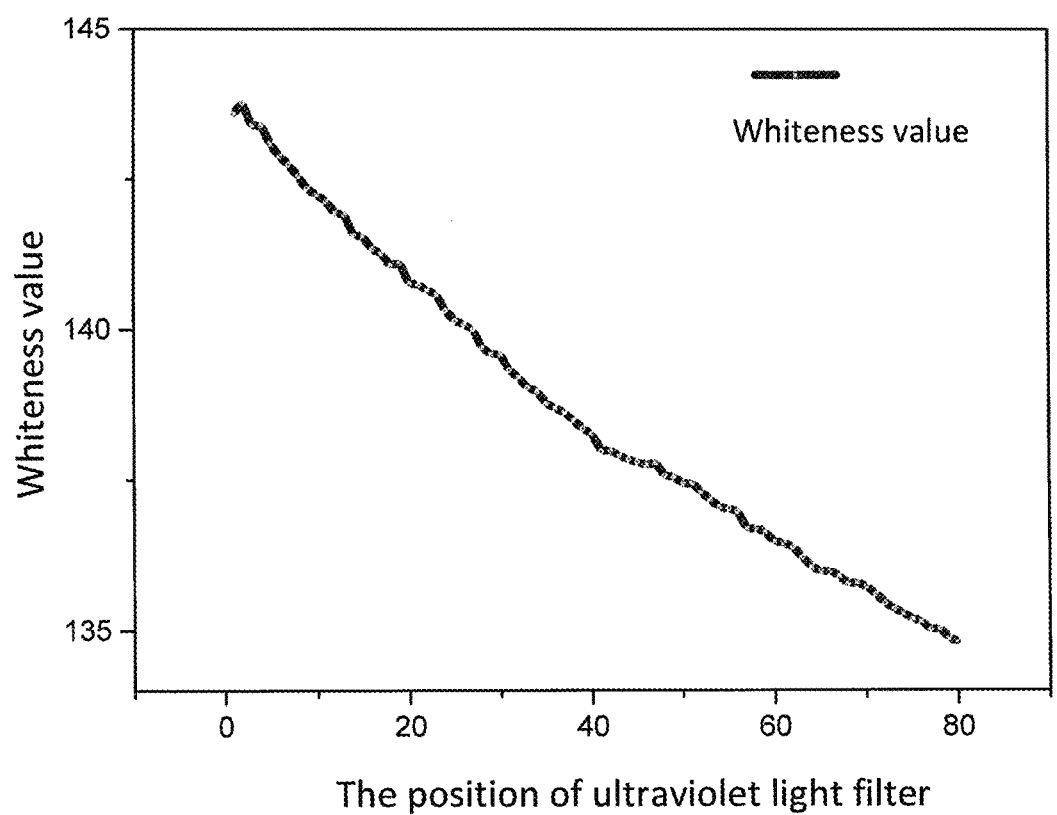
FIG. 23 is a schematic diagram showing convergence of the whiteness-corrected whiteness value as the movement of the UV light filter according to one embodiment of the present invention.

FIG. 23 is a schematic diagram of the whiteness-corrected whiteness value moving to converge with the movement of UV light filters according to one embodiment of the present invention. Since the light source used in the present invention has a weaker intensity of ultraviolet light than sunlight, in this case the measured whiteness value is significantly different from that measured in real sunlight. Therefore, it is necessary to change the light source by the ultraviolet band pass filter of the ultraviolet light filtering device so that the ratio of the ultraviolet light to the visible light entering the integrating sphere is similar to the ratio in the sunlight, and the whiteness measured in this case will be more accurate. As for eventually how much visible light should be filtered out, or what position should the filter move to, this will be determined by standard calibration board with known whiteness.

At present, there are mainly two formulas for calculating the whiteness value. One is the CIE whiteness calculation formula proposed by the whiteness sub-committee of the International Commission on Illumination in 1983, $W_{cie}=Y+800\cdot(x_0-x)+1700\cdot(y_0-y)$, wherein, $x_0=0.313795$, $y_0=0.330972$. The other is the linearized whiteness calculation formula developed by Ganz, $W_{Ganz}=Y+P\cdot(x_0-x)+Q\cdot(y_0-y)$, wherein, $(x_0, y_0)$ is the coordinate of the colorless point of the D65 light source, and the parameters P, Q are determined by the color preference, as shown in the table below,

|   | Red | Colorless | Green |
|---|---|---|---|
| P | −800 | +800 | +1700 |
| Q | +3000 | +1700 | +900 |

The process of whiteness correction comprises the following steps: 1) placing the standard whiteboard on the sample holder, driving the movement of ultraviolet light filter by the program-controlled stepper motor, calculating the changes in whiteness value with the movement of ultraviolet light filter until the whiteness value converges close to the standard value, which is shown in FIG. 23, when the movement of ultraviolet light filter stops; 2) performing system calibration when the ultraviolet light filter stops at the aforementioned position; 3) If necessary, selecting a number of samples for image acquisition and whiteness value calculation, and comparing with the standard instrument test results to establish the fitting relationship between the instruments, and finally adjusting the whiteness test result of the multispectral imaging device to the standard level.

While the invention has been described by way of specific examples, it will be understood by those skilled in the art that various changes and substitutions may be made in the invention without departing from the scope of the invention. In addition, various modifications may be made to the invention for specific situations or materials without departing from the scope of the invention. Therefore, the present invention is not limited to the specific embodiments disclosed herein, and includes all the embodiments which fall within the scope of the claims of the present invention.

What is claimed is:

1. A multispectral color imaging device, comprising:
a light house module, said light house module comprising a light source and a light intensity collection device surrounding the light source, wherein said light intensity collection device collects light radiated from the light source via reflection and emits the collected light through an opening of the light intensity collection device;

an integrating sphere module, said integrating sphere module comprising an integrating sphere, a light inlet at a first side of the integrating sphere, a sample holder gateway at a second side of the integrating sphere, a light outlet at the top of the integrating sphere, and a sample holder having access to an internal space of the integrating sphere, wherein said first and second sides are opposite to each other, said light inlet couples to the opening of the light intensity collection device, said sample holder accesses the internal space of the integrating sphere through said sample holder gateway and is positioned in alignment with the light outlet during imaging, and said sample holder is slidable into the integrating sphere via a slideway element; and a filter wheel module, said filter wheel module comprising a camera, a filter wheel installed below the camera, and a lens installed below the filter wheel, said lens coupling to the light outlet of the integrating sphere, said filter wheel having a plurality of channels and a plurality of filters located therein, wherein one of the filters is configurable to position between the camera and the lens for filtering.

2. The multispectral color imaging device of claim 1, further comprising:
an ultraviolet light filtering module, said ultraviolet light filtering module being positioned between the light house module and the integrating sphere module for adjusting a ratio between ultraviolet light and visible light of the light emitted from the light house module to the integrating sphere module.

3. The multispectral color imaging device of claim 1, wherein said sample holder comprises a platform portion and a frame portion, said frame portion comprising a sample fixing groove and a linear slideway, wherein said linear slideway is configured to enter the integrating sphere through the sample holder gateway and to be fixed to the inner wall of the integrating sphere, and said sample fixing groove is configured to attach to the platform portion and to slide along said linear slideway so that the platform portion is also slidable along the linear slideway.

4. The multi spectral color imaging device of claim 1, wherein said sample holder comprises a sphere lid portion, said sphere lid portion having a dimension that matches a dimension of the sample holder gateway so that when the sample holder is at an imaging position, the sphere lid portion covers the sample holder gateway to ensure the completeness of the integrating sphere for homogeneous lighting.

5. The multispectral color imaging device of claim 2, wherein said ultraviolet light filtering module comprises an ultraviolet filter frame and a guideway element, wherein said ultraviolet filter frame has installed therewithin an ultraviolet-light-passing film, an ultraviolet-light-blocking film, and an all-light-passing film, and said guideway element is configured to move together with the ultraviolet filter frame.

6. The multispectral color imaging device of claim 1, wherein said camera seamlessly connects to a camera port on upper cover of the filter wheel through a port on the camera, and said lens seamlessly connects to a bayonet interface on lower cover of the filter wheel through a bayonet of the lens.

7. The multispectral color imaging device of claim 6, wherein said camera port comprises an annular protrusion in the middle of the camera port, and a mounting portion surrounding the annular protrusion, wherein the annular protrusion has thread on the outer surface thereof, and wherein said port on the camera is configured to seamlessly connect with said camera port.

8. The multispectral color imaging device of claim 6, wherein said bayonet interface comprises a hollow bottom plate portion located at the bottom of the bayonet interface, an outer wall interface portion, an inner wall located at the inner side of the outer wall interface portion and along interface circumference and a guide chute on the inner wall, wherein said guide chute comprises a discontinuous chute wall, the bayonet of the lens includes an outer peripheral wall, an outer wall, and a guiding portion on the outer wall capable of cooperating with the guide chute, said guiding portion enters the guide chute from the gap of the discontinuous chute wall and moves along the guide chute until said outer peripheral wall contacts and seals said outer wall interface portion.

9. The multispectral color imaging device of claim 6, wherein center of a sensor of the camera, center of the lens, and center of a filter in use of the filter wheel are on a straight line.

10. The multispectral color imaging device of claim 1, wherein said filter wheel comprises a filter rotating element installed in a hollow part of the filter wheel, wherein said filter rotating element comprises an outer rim region for positioning said filters, and is rotated by a driving device for positioning a selected filter in alignment with the lens and the camera wherein said positioning is controlled by a photoelectric switch.

11. The multispectral color imaging device of claim 1, wherein said filter wheel module further comprises a motor drive control module and a micro limit switch, wherein said motor drive control module is configured for controlling a motor enabling automatic focusing of the lens, and said micro limit switch is configured to prevent detachment of the lens.

12. A multispectral color imaging device, comprising: a light house module, said light house module comprising a light source and a light intensity collection device surrounding the light source, wherein said light intensity collection device collects light radiated from the light source via reflection and emits the collected light through an opening of the light intensity collection device; an integrating sphere module, said integrating sphere module comprising an integrating sphere, a light inlet at a first side of the integrating sphere, a sample holder gateway at a second side of the integrating sphere, a light outlet at the top of the integrating sphere, and a sample holder having access to an internal space of the integrating sphere, wherein said first and second sides are opposite to each other, said light inlet couples to the opening of the light intensity collection device, said sample holder accesses the internal space of the integrating sphere through said sample holder gateway and is positioned in alignment with the light outlet during imaging, and said sample holder is slidable into the integrating sphere via a slideway element; a filter wheel module, said filter wheel module comprising a camera, a filter wheel installed below the camera, and a lens installed below the filter wheel, said lens coupling to the light outlet of the integrating sphere, said filter wheel having a plurality of channels and a plurality of filters located therein, wherein one of the filters is configurable to position between the camera and the lens for filtering; and an ultraviolet light filtering module, said ultraviolet light filtering module being positioned between the light house module and the integrating sphere module for adjusting a ratio between ultraviolet light and visible light of the light emitted from the light house module to the integrating sphere module.

13. A multispectral color imaging device, comprising: a light house module, said light house module comprising a light source and a light intensity collection device surrounding the light source, wherein said light intensity collection device collects light radiated from the light source via reflection and emits the collected light through an opening of the light intensity collection device; an integrating sphere module, said integrating sphere module comprising an integrating sphere, a light inlet at a first side of the integrating sphere, a sample holder gateway at a second side of the integrating sphere, a light outlet at the top of the integrating sphere, and a sample holder having access to an internal space of the integrating sphere, wherein: said first and second sides are opposite to each other; said light inlet couples to the opening of the light intensity collection device; said sample holder accesses the internal space of the integrating sphere through said sample holder gateway and is positioned in alignment with the light outlet during imaging; and said sample holder comprises a sphere lid portion, said sphere lid portion having a dimension that matches a dimension of the sample holder gateway so that when the sample holder is at an imaging position, the sphere lid portion covers the sample holder gateway to ensure the completeness of the integrating sphere for homogeneous lighting, and said sample holder is slidable into the integrating sphere via a slideway element; and a filter wheel module, said filter wheel module comprising a camera, a filter wheel installed below the camera, and a lens installed below the filter wheel, said lens coupling to the light outlet of the integrating sphere, said filter wheel having a plurality of channels and a plurality of filters located therein, wherein one of the filters is configurable to position between the camera and the lens for filtering.

* * * * *